(12) United States Patent
Moon

(10) Patent No.: US 11,997,559 B2
(45) Date of Patent: May 28, 2024

(54) LOCATION MEASUREMENT DEVICE FOR MEASURING LOCATION OF TARGET TERMINAL IN WIRELESS COMMUNICATION SYSTEM AND LOCATION MEASUREMENT METHOD THEREOF

(71) Applicants: IUCF-HYU (INDUSTRY-UNIVERSITY COOPERATION FOUNDATION HANYANG UNIVERSITY), Seoul (KR); INFOSEIZE SYSTEMS CO. LTD., Seoul (KR)

(72) Inventor: Hi Chan Moon, Seoul (KR)

(73) Assignees: IUCF-HYU (INDUSTRY-UNIVERSITY COOPERATION FOUNDATION HANYANG UNIVERSITY), Seoul (KR); INFOSEIZE SYSTEMS CO. LTD., Seoul (KR)

( * ) Notice: Subject to any disclaimer, the term of this patent is extended or adjusted under 35 U.S.C. 154(b) by 477 days.

(21) Appl. No.: 17/283,403

(22) PCT Filed: Oct. 8, 2019

(86) PCT No.: PCT/KR2019/013154
§ 371 (c)(1),
(2) Date: Apr. 7, 2021

(87) PCT Pub. No.: WO2020/076039
PCT Pub. Date: Apr. 16, 2020

(65) Prior Publication Data
US 2021/0345061 A1    Nov. 4, 2021

(30) Foreign Application Priority Data

Oct. 8, 2018  (KR) .......................... 10-2018-0120038
Oct. 7, 2019  (KR) .......................... 10-2019-0124204

(51) Int. Cl.
*H04W 4/02*   (2018.01)
*G01S 19/01*  (2010.01)
(Continued)

(52) U.S. Cl.
CPC ............... *H04W 4/02* (2013.01); *G01S 19/01* (2013.01); *H04W 8/08* (2013.01); *H04W 56/004* (2013.01); *H04W 64/003* (2013.01)

(58) Field of Classification Search
None
See application file for complete search history.

(56) References Cited

U.S. PATENT DOCUMENTS

| 9,648,573 B2 | 5/2017 | Siomina et al. |
| 2007/0238463 A1* | 10/2007 | Ogami ............ H04W 36/0033 455/436 |

(Continued)

FOREIGN PATENT DOCUMENTS

| CN | 1433646 A | 7/2003 |
| CN | 103563447 A | 2/2014 |

(Continued)

OTHER PUBLICATIONS

International Search Report for PCT/KR2019/013154, dated Jan. 23, 2020.
(Continued)

*Primary Examiner* — Frantz Bataille
(74) *Attorney, Agent, or Firm* — Sughrue Mion, PLLC

(57) ABSTRACT

Provided are a location measurement device and a location measurement method thereof, wherein the location measurement device receives an uplink signal from at least one target terminal which is subject to measuring a location or determining existence or nonexistence, and variably sets an uplink search time window of the uplink signal received from the target terminal according to at least one or two of (Continued)

a location of the location measurement device, a location of a base station, a cell radius of the base station, a distance from the base station, a range of location at which the target terminal is predicted to exist, and a signal detection range in which the uplink signal is detected from the target terminal.

13 Claims, 19 Drawing Sheets

(51) Int. Cl.
*H04W 8/08* (2009.01)
*H04W 56/00* (2009.01)
*H04W 64/00* (2009.01)

(56) References Cited

U.S. PATENT DOCUMENTS

| | | | |
|---|---|---|---|
| 2008/0273481 A1* | 11/2008 | Chang | G08C 19/16 370/345 |
| 2014/0133335 A1 | 5/2014 | Morioka | |
| 2015/0011236 A1 | 1/2015 | Kazmi et al. | |
| 2017/0048732 A1* | 2/2017 | Shekalim | H04B 17/318 |

FOREIGN PATENT DOCUMENTS

| | | |
|---|---|---|
| EP | 2173131 A1 | 4/2010 |
| KR | 10-1446657 B1 | 10/2014 |
| KR | 10-1779767 B1 | 9/2017 |
| WO | 01/41482 A1 | 6/2001 |
| WO | 2013/141771 A1 | 9/2013 |

OTHER PUBLICATIONS

Chinese Office Action dated Aug. 31, 2023 in Chinese Application No. 201980066543.4.

* cited by examiner

FIG. 8

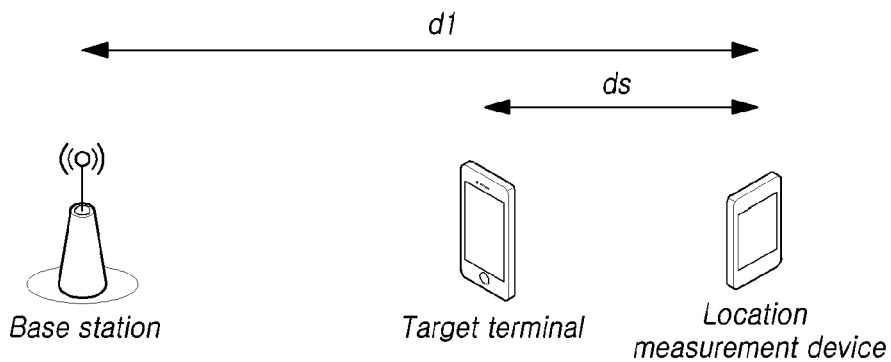

A time calculated with respect to a time of the base station
A time at which a downlink is received by the location measurement device:
$d1/c$ (a reference time of the location measurement device)
A transmission time of the target terminal = $-(d1-ds)/c$
A signal reception time of the location measurement device = $-(d1-ds)/c + 2ds/c$ A time at which a signal is received with respect to the reference time of the location measurement device = $-(d1-ds)/c-(d1-ds)/c = -2(d1-ds/c) = -2d1/c + 2ds/c$

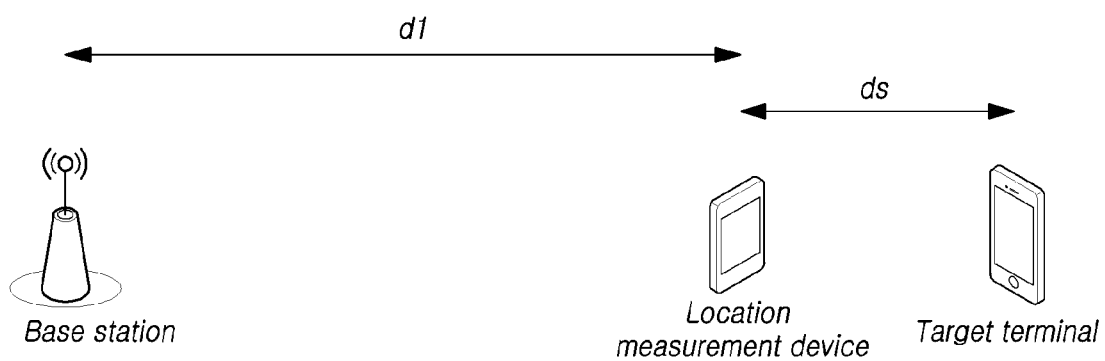

A time calculated with respect to a time of the base station
A time at which a downlink is received by the location measurement device:
$d1/c$ (a reference time of the location measurement device)
A transmission time of the target terminal = $-(d1+ds)/c$
A signal reception time of the location measurement device = $-(d1+ds)/c + ds/c$ A time at which a signal is received with respect to the reference time of the location measurement device = $-(d1+ds)/c-(d1-ds)/c = -2d1/c$

FIG. 9

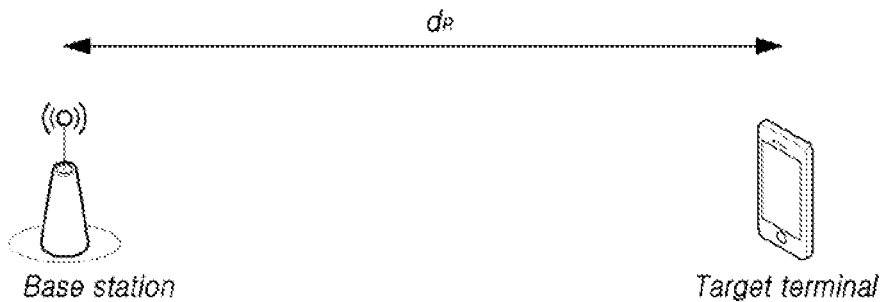

Base station      Target terminal

A time calculated with respect to a time of the base station
A time at which a downlink is received by the location measurement device : $d_R/c$
(a reference time of the location measurement device)
A transmission time of the target terminal = $-d_R/c$
A signal reception time of the location measurement device = $-d_R/c$
A time at which a signal is received with respect to the reference time of the location measurement device = $-2d_R/c$

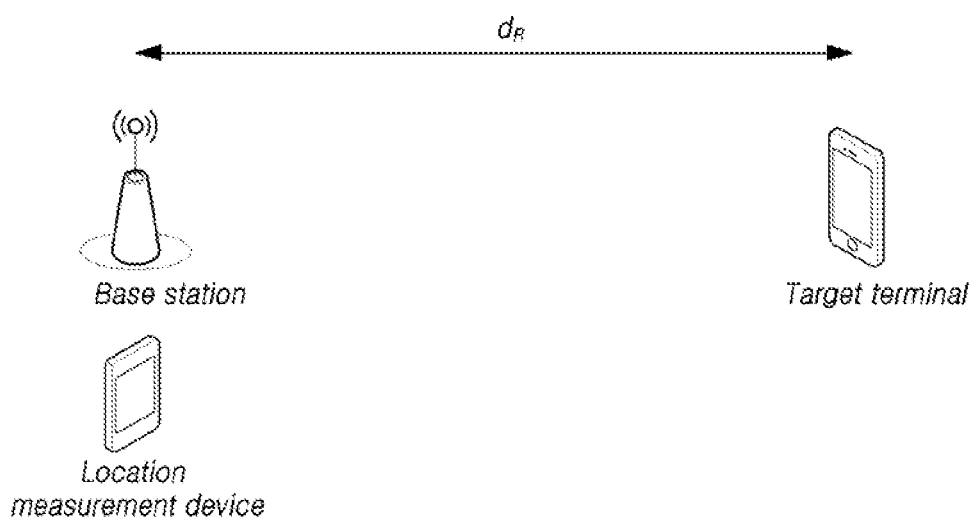

A time calculated with respect to a time of the base station
A time at which a downlink is received by the location measurement device
: 0 (a reference time of the location measurement device)
A transmission time of the target terminal = $-d_R/c$
A signal reception time of the location measurement device = 0

A time at which a signal is received with respect to the reference time of the location measurement device = 0

FIG.10

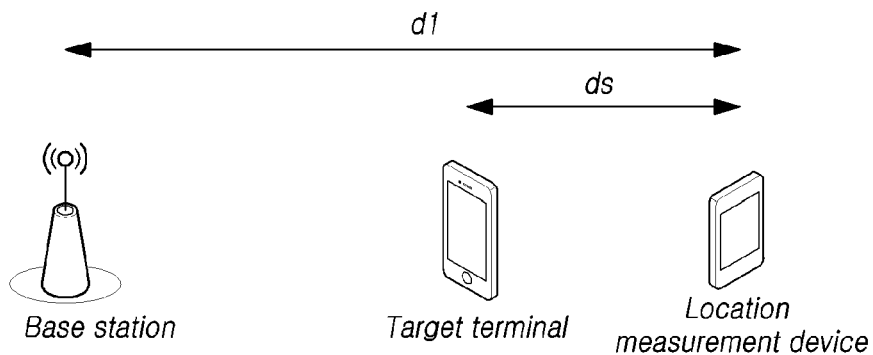

A time calculated with respect to a time of the base station(W-CDMA)
A time at which a downlink is received by the location measurement device :
d1/c (a reference time of the location measurement device)
A transmission time of the target terminal = -(d1-ds)/c
A signal reception time of the location measurement device = (d1-ds)/c + ds/c A time at which a signal is received with respect to the reference
time of the location measurement device = 0

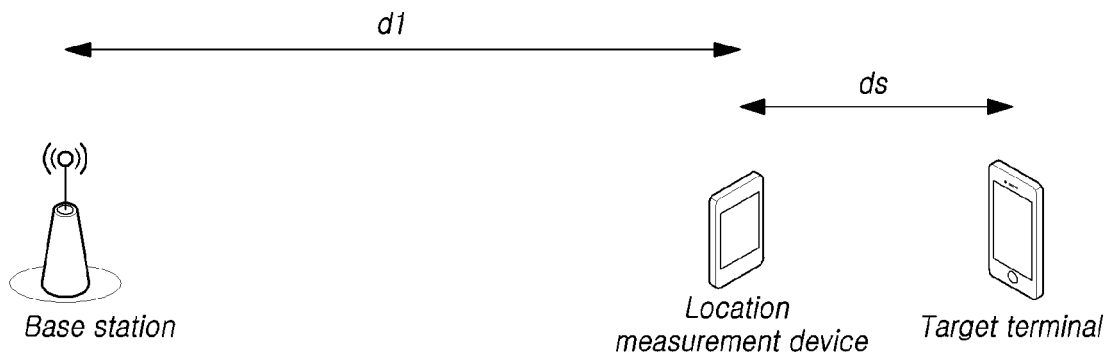

A time calculated with respect to a time of the base station(W-CDMA)
A time at which a downlink is received by the location measurement device :
d1/c (a reference time of the location measurement device)
A transmission time of the target terminal = -(d1+ds)/c
A signal reception time of the location measurement device = (d1+ds)/c + ds/c A time at which a signal is received with respect to the reference time of the location
measurement device = 2ds/c

FIG.18

| Cell ID | Time offset<br>(Frame boundary of a serving cell<br>with respect to a neighboring cell) |
|---------|---------------------------------------------------------------------------------------|
| ID1     | OFFSET 1                                                                              |
| ID2     | OFFSET 2                                                                              |
| ⋮       | ⋮                                                                                     |
| ID_N    | OFFSET N                                                                              |

LOCATION MEASUREMENT DEVICE FOR MEASURING LOCATION OF TARGET TERMINAL IN WIRELESS COMMUNICATION SYSTEM AND LOCATION MEASUREMENT METHOD THEREOF

CROSS REFERENCE TO RELATED APPLICATIONS

This application is a National Stage of International Application No. PCT/KR2019/013154 filed Oct. 8, 2019, claiming priority based on Korean Patent Application No. 10-2018-0120038 filed Oct. 8, 2018 and Korean Patent Application No. 10-2019-0124204 filed Oct. 7, 2019, the entire contents of which are hereby incorporated by reference.

TECHNICAL FIELD

The present disclosure relates to methods and devices for measuring a location of a target terminal by using wireless communication systems.

BACKGROUND ART

Recently, for public services, third parties, not communication service providers, have attempted to acquire a location or movement information of terminals placed in a specific area. As an example, public organizations of the Korea Expressway Corporation and the Korea National Police Agency have attempted to acquire information such as the number or speed of terminals passing through a specific area.

In such a situation, a solution for allowing a third party other than a communication service provider to acquire information on a location or traffic of terminals placed in a specific area for the purpose of public service has not been provided yet. In particular, there is a substantial limitation of requiring techniques for acquiring such information to be implemented without affecting communication equipment and communication networks which have been already installed. Further, communication service providers are desired to estimate a location of terminals more accurately.

A location measurement device for measuring a location of a terminal has been introduced; however, there has not been introduced methods of acquiring timing synchronization to an uplink signal from a target terminal yet.

DETAILED DESCRIPTION OF THE INVENTION

Technical Problem

A location measurement device receives resource assignment of, and information related to, a target terminal from a mobile communication system. The location measurement device can detect an uplink signal transmitted by the target terminal based on this, and acquire information on the presence or absence of the target terminal, a location of the target terminal, and the like. In this regard, it is very important to acquire synchronization to an uplink signal in order to detect the uplink.

In the present disclosure, embodiments are related to methods for acquiring timing synchronization to an uplink signal from a target terminal.

Technical Solution

Embodiments described herein relates to methods and location measurement devices for acquiring approximate timing synchronization to a mobile communication system based on a downlink signal transmitted by the mobile communication system.

A location measurement device according to embodiments described herein can acquire signal synchronization so that a reception SNR of an uplink signal can be maximized by setting a certain period of time window for uplink signal synchronization. In this process, such a time window may be variously set according to which location a base station is present in, where the location measurement device is located within one cell, and which location or range the location measurement device desires to detect an uplink signal from a terminal in. In another embodiment, the time window may be set depending on a service radius of a cell to which the location measurement device belongs. In further another embodiment, the time window may be variously set according to an expected location or range in which it is expected that a target terminal is placed.

In order to implement such embodiments, in accordance with one aspect of the present disclosure, there is provided a location measurement device including an uplink signal receiver for receiving an uplink signal from at least one target terminal whose location is required to be measured or whose presence or absence is required to be determined, and a controller for variably setting an uplink search time window of the uplink signal received from the at least one target terminal according to one, or two or more, of a location of the location measurement device, a location of a base station, a cell radius of the base station, a distance from the base station, a range of locations in which it is expected that the at least one target terminal is placed, and a signal detection range in which the uplink signal from the at least one target terminals is detected.

In accordance with another aspect of the present disclosure, there is provided a location measurement method of a location measurement device including receiving an uplink signal from at least one target terminal whose location is required to be measured or whose presence or absence is required to be determined, and variably setting an uplink search time window of the uplink signal received from the at least one target terminal according to one, or two or more, of a location of the location measurement device, a location of a base station, a cell radius of the base station, a distance from the base station, a range of locations in which it is expected that the at least one target terminal is placed, and a signal detection range in which the uplink signal from the at least one target terminal is detected.

Effects of the Invention

In accordance with aspects of the present disclosure, when a timing synchronization window setting method for detecting an uplink signal from a target terminal is used, it is possible to improve performance of acquiring timing synchronization of uplink from the terminal required to be detected. Further, an associated uplink receiver can be implemented without significantly increasing the complexity of a location measurement device according to aspects of the present disclosure.

BRIEF DESCRIPTION OF THE DRAWINGS

FIG. 8 illustrates an example of a reception time of an uplink signal from a target terminal when a location measurement device is used in the LTE system according to one aspect of the present disclosure.

FIG. 9 illustrates an example of setting a search window for a signal from a target terminal based on a service radius dR of a cell according to one aspect of the present disclosure.

FIG. 10 illustrates an example of setting a time window for detecting an uplink signal when a location measurement device is used in the W-CDMA system according to another aspect of the present disclosure.

FIG. 18 illustrates an example of an offset message related to a frame boundary for a neighboring cell which is transmitted by a location measurement server according to one aspect of the present disclosure.

BEST MODE FOR CARRYING OUT THE INVENTION

Figure 1:
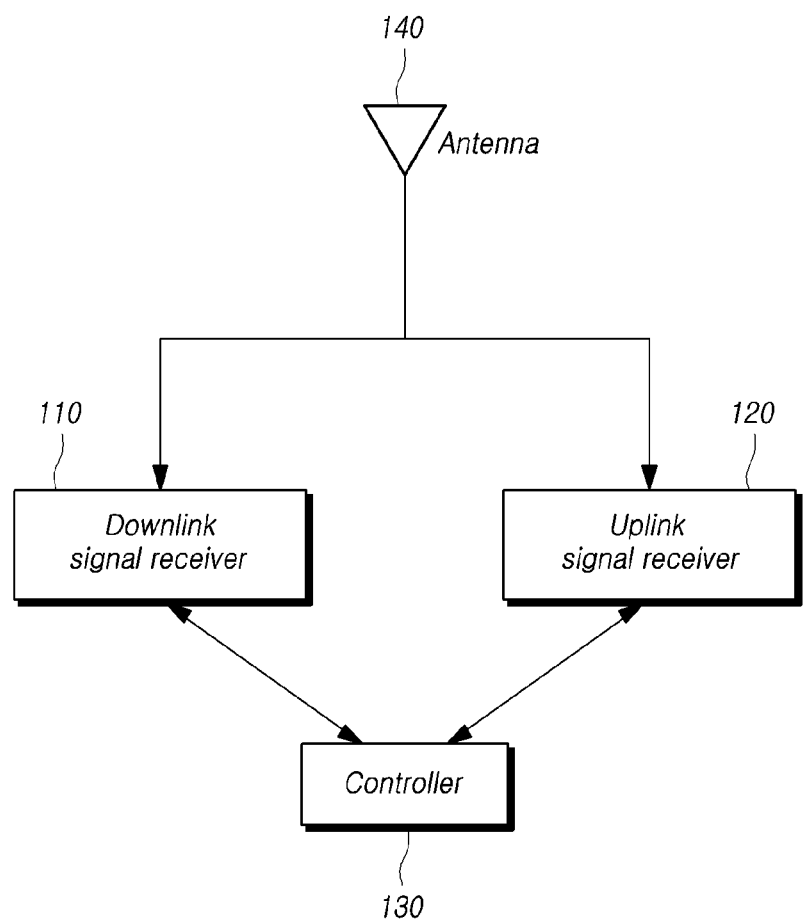
FIG. 1 illustrates an example of a location measurement device for measuring a location of a target terminal according to one aspect of the present disclosure.

Hereinafter, other aspects of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, detailed discussions on known functions and configurations incorporated herein may be omitted when it is needed to focus on the subject matter of the present disclosure.

In the present disclosure, a wireless communication system denotes a system for providing various communication services such as a voice communication service, a packet data service, etc. The wireless communication system includes a terminal (includes a user device or a user equipment (UE)) and a base station (BS).

The terminal is a generic term referring to devices used in wireless communication. For example, the terminal may be referred to, but not limited to, a UE supporting Wideband Code Division Multiple Access (WCDMA), Long Term Evolution (LTE), High Speed Packet Access (HSPA), International Mobile Telecommunications (IMT)-2020 (5G or New Radio), or the like, a mobile station (MS) supporting the Global System for Mobile Communication (GSM), a user terminal (UT), a subscriber station (SS), a wireless device, or the like. Embodiments described herein are based on the LTE system. However, it should be noted that such embodiments may be applied to any systems substantially equally or with modifications readily apparent to those skilled in the art.

The base station or cell generally denotes a station communicating with the terminal. The base station or cell is a generic term referring to, but not limited to, all of various communication service areas and devices, such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), and a small cell.

Each of these various cells is controlled by a base station. Therefore, the base station may be classified into two types. 1) One type of the base station may denote an apparatus providing a megacell, a macrocell, a microcell, a picocell, a femtocell, or a small cell that forms a communication service area. 2) The other type of the base station may denote the communication service area. Apparatuses that form and provide a certain radio area, and that are controlled by one or more identical entities or that interact with one another for enabling two or more entities to cooperate with one another to provide the radio area may be referred to as the type 1) base station. According to a scheme of forming and providing a communication service area, a point, a transmission/reception point, a transmission point, a reception point, or the like is an example of this type of base station. A communication service area itself to which a terminal or a neighboring base station transmits a signal or from which the terminal or the neighboring base station receives a signal may be referred to as the type 2) base station.

In the present disclosure, the cell may denote a coverage of a signal transmitted from a transmission/reception point, a component carrier having a coverage of a signal transmitted from a transmission point or a transmission/reception point, or a transmission/reception point itself.

The terminal and the base station herein are entities for performing two types of transmissions or receptions (uplink and downlink) used to embody embodiments, examples, technologies, or technical ideas described in the present disclosure. Thus, the terminal and the base station herein include all entities capable of performing such operations and are not limited to specific terms or words.

Herein, the uplink (UL) denotes data transmission/reception by a UE to/from a base station, and the downlink (DL) denotes data transmission/reception by a base station to/from a UE.

An uplink transmission and a downlink transmission may be performed using a time division duplex (TDD) technique in which a transmission can be performed at a time different from another transmission, a frequency division duplex (FDD) technique in which a transmission can be performed at a frequency different from another transmission, or a hybrid technique of the frequency division duplex (FDD) and the time division duplex (TDD).

Further, in a standard for a wireless communication system, uplink and downlink are configured based on a single carrier or a pair of carriers.

Control information is transmitted in the uplink and/or the downlink configured with a control channel, such as a physical downlink control channel (PDCCH), a physical uplink control channel (PUCCH), and the like, and Data are transmitted in the uplink and/or the downlink configured with a data channel, such as a physical downlink shared channel (PDSCH), a physical uplink shared channel (PUSCH), and the like.

The downlink may denote communication or a communication path from multiple transmission/reception points to a terminal, and the uplink may denote communication or a communication path from the terminal to the multiple transmission/reception points. In the downlink, a transmitter may be a part of multiple transmission/reception points, and a receiver may be a part of a terminal. In the uplink, a transmitter may be a part of a terminal and a receiver may be a part of multiple transmission/reception points.

Hereinafter, a situation where a signal is transmitted or received through a channel such as the PUCCH, the PUSCH, the PDCCH, or the PDSCH, may be expressed as the transmission or reception of the PUCCH, the PUSCH, the PDCCH, or the PDSCH.

Meanwhile, higher layer signaling described herein includes radio resource control (RRC) signaling transmitting RRC information containing an RRC parameter.

A base station performs a downlink transmission to terminals. The base station may transmit a physical downlink control channel for transmitting i) downlink control information, such as scheduling required to receive a downlink data channel that is a primary physical channel for a unicast transmission, and ii) scheduling approval information for a transmission through an uplink data channel. Hereinafter, transmitting/receiving a signal through each channel may be described in such a manner that a corresponding channel is transmitted/received. A base station can transmit resource assignment information to a terminal through a PDCCH, Further, the base station can transmit a control signal for resource assignment and signal transmission to the terminal through a PDSCH as well.

Any multiple access techniques applied to wireless communication systems may be applicable to wireless communication systems according to aspects of the present disclosure. For example, the wireless communication system may employ various multiple access techniques, such as Time Division Multiple Access (TDMA), Frequency Division Multiple Access (FDMA), Code Division Multiple Access (CDMA), Orthogonal Frequency Division Multiple access (OFDMA), Non-Orthogonal Multiple Access (NOMA), OFDM-TDMA, OFDM-FDMA, OFDM-CDMA, or the like. The NOMA includes Sparse Code Multiple Access (SCMA), Low Density Spreading (LDS), and the like.

Embodiments or examples described herein may be applicable to resource assignment in both an asynchronous wireless communication evolving into LTE/LTE-advanced and IMT-2020 from GSM, WCDMA, and HSPA, and a synchronous wireless communication evolving into code division multiple access, CDMA-2000, and UMB.

In the present disclosure, a Machine Type Communication (MTC) terminal may denote a terminal supporting low costs (or low complexity), a terminal supporting coverage enhancement, or the like. As another example, the MTC terminal may denote a terminal defined as a predetermined category for supporting low cost (or low complexity) and/or coverage enhancement.

In the present disclosure, a NarrowBand Internet of Things (NB-IoT) terminal denotes a terminal supporting radio access for cellular IoT. NB-IoT technology has been developed to provide improved indoor coverage, support for large-scale low-speed terminals, low latency sensitivity, very low terminal costs, low power consumption, and optimized network architecture.

An enhanced Mobile BroadBand (eMBB), massive Machine-Type Communication (mMTC), and Ultra Reliable and Low Latency Communication (URLLC) are proposed as representative usage scenarios for NR having been discussed in the 3GPP recently.

In the present disclosure, a frequency, a frame, a sub-frame, a resource, a resource block (RB), a region, a band, a sub-band, a control channel, a data channel, a synchronization signal, various reference signals, various signals, and various messages, associated with NR may be interpreted as meanings that were used in the past or are used in the present or as various meanings that will be used in the future.

An information collection device according to aspects of the present disclosure may be mainly used for measuring a signal from a target terminal, and based on this, measuring a location of the target terminal. From this function perspective, the information collection device may be referred to as a signal measurement device, a location measurement device, a position finder, and the like; thus, these devices may be regarded as substantially equal or similar devices.

In accordance with aspects of the present disclosure, in a wireless communication system, particularly, a mobile communication system, methods, apparatuses and systems are discussed for enabling location measurement devices to acquire timing synchronization to an uplink signal from a target terminal in order to acquire information on which location a specific terminal is located in.

A device according to embodiments described herein can configure a suitable uplink signal detection time window based on information on a location in a cell of a mobile communication system, a cell configuration, and the like, and based on the window, detect a signal from a target terminal.

Embodiments described herein relate to technologies of identifying the presence or absence of terminals and acquiring location information thereof.

Devices and methods in which embodiments described herein are applicable may be used for services of providing accurate location information of terminals using mobile communication systems, as well as services of providing traffic information and public services through the wireless communication systems.

Embodiments and examples described herein are expected to be applied in various fields, such as a service of providing a location of a terminal, road control, traffic control, a location information service, and security.

A related technology that is closely associated with the embodiments or examples described herein is mobile communication systems.

Hereinafter, embodiments of the present disclosure will be discussed in detail with reference to accompanying drawings. Further, in describing embodiments of the present disclosure, detailed discussions on known functions and configurations incorporated herein may be omitted in order to avoid obscuring concepts of such embodiments. The terms described below are terms defined considering embodiments, examples, and technical ideas in the present disclosure, and may be differently expressed according to intentions or customs of a user, an operator, or the like. Thus, such definition should be interpreted based on the context of the present disclosure.

In the present disclosure, an uplink search time window may be expressed as various terms, such as a time window, a search window, a search time window, a search time period, a detection window, a detection time window, or the like; however, it should be noted that these terms bear an equal meaning.

Further, in the present disclosure, a signal detection range for detecting an uplink signal from a target terminal may be expressed as various terms, such as a searchable distance, a searchable range, or the like; however, it should be noted that these terms bear an equal meaning.

Further, in the present disclosure, a cell radius of a base station may be expressed as various terms, such as a service radius of a cell, a cell radius, a radius of a base station, or the like; however, it should be noted that these terms bear an equal meaning.

Further, in the present disclosure, a location measurement device may be expressed as various terms, such as a signal collection device, a signal measurement device, an information collection device or the like; however, it should be noted that these terms bear an equal meaning.

In the present disclosure, a GPS receiver may be used as a method for acquiring information on a location of a receiver and time by receiving a signal from an external source.

The GPS receiver may include different types of receivers that are used for providing the same functionality, such as SBAS, Galileo, or the like; thus, it bears a broad meaning.

Meanwhile, each of embodiments or examples described below may be applicable individually or in any combination with one or more other embodiments or examples.

FIG. 1 shows a configuration of a mobile communication system. A device capable of collecting information on a neighboring terminal as shown in FIG. 1 is provided in Korea Pat. No. 1992486, entitled "METHOD AND APPARATUS FOR ACQUIRING LOCATION INFORMATION BY USER EQUIPMENT THROUGH RADIO COMMUNICATION SYSTEM. In this patent, by employing a device that receives uplink resource assignment information transmitted from a wireless communication system, and an uplink receiver, based on the uplink resource assignment information, location information of a terminal can be acquired based on information on whether the terminal transmitting a signal over the corresponding uplink resource is placed, an intensity of the signal, and the like. Embodiments described herein may be based on a situation in which uplink resource assignment information is acquired via at least one downlink signal receiver.

Referring to FIG. 1, an information collection device or signal measurement device according to aspects of the present disclosure may include a downlink signal receiver 110, an uplink signal receiver 120 and an antenna 140. Thus, the information collection device for collecting information on a neighboring terminal can receive both an uplink signal and a downlink signal, unlike a normal mobile communication terminal or a base station.

The structure of FIG. 1 illustrates that uplink and downlink signals can be received via a single antenna 140. Further, this information collection device can enable a controller 130 to control the uplink signal receiver 120 and the downlink signal receiver 110 to interoperate with each other. However, embodiments described herein are not limited thereto. For example, in the structure of FIG. 1, when needed, an uplink antenna and a downlink antenna, which are separated from each other, may be employed, and multiple uplink antennas and multiple uplink receivers may be employed. The signal measurement device with the structure shown in FIG. 1 can acquire uplink resource assignment information for a terminal, and by measuring an uplink signal based on this, acquire whether the terminal is placed in the vicinity of the device and location information of the terminal. In this process, the signal measurement device can acquire the uplink resource assignment information by receiving control information transmitted on downlink of the mobile communication system via the downlink signal receiver 110. For examples of location measurement devices that may be implemented in the present disclosure, reference is made to Korea Patent Application No. 10-2018-0046139, entitled "APPARATUS AND METHOD FOR POSITIONING OF MOBILE COMMUNICATION UE"; Korea Patent Application No. 10-2018-0048825, entitled "APPARATUS AND METHOD FOR CONFIGURING UPLINK SIGNAL FOR POSITIONING OF MOBILE COMMUNICATION UE"; Korea Patent Application No. 10-2018-0101066, entitled "METHOD AND APPARATUS FOR POSITIONING USER EQUIPMENT IN MOBILE COMMUNICATION SYSTEM"; and Korea Patent Application No. 10-2019-0045762, entitled "POSITION MEASUREMENT SYSTEM FOR MOBILE TERMINAL". Descriptions in these patent applications may make up of a part of the description of the present disclosure.

Figure 2:
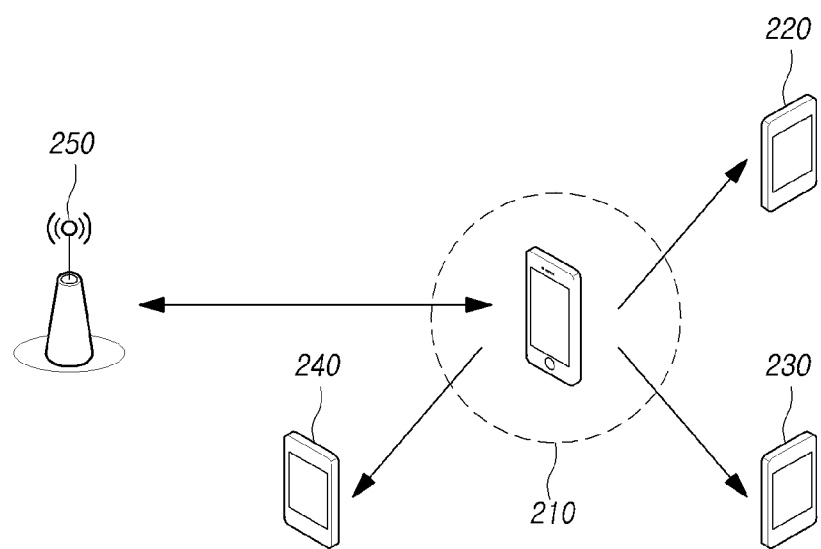
FIG. 2 illustrates a conception of location measurement according to one aspect of the present disclosure.

FIG. 2 illustrates operations of a location measurement device according to one aspect of the present disclosure.

Referring to FIG. 2, each of a base station 250 and a target terminal 210 transmits a signal to, and receives a signal from, each other in mobile communication systems. One or more location measurement devices (220, 230, 240) may be placed in the vicinity of a target terminal 210 whose location is required to be measured. The location measurement devices (220, 230, 240) can receive a signal from the target terminal 210, measure information on a signal intensity of the received signal, an arrival time delay, a reception direction, and the like, and calculate a location of the target terminal 210 based on this. In one embodiment, the location of the target terminal can be calculated such that each of one or more location measurement devices transmits respective measurement results to a location measurement server, and then, the location measurement server calculates the location of the target terminal. The location information of the target terminal obtained by the calculation may be provided to each location measurement device.

In another embodiment, the location measurement devices can share respective measurement results with one another, and then, one or more location measurement devices can measure the location of the target terminal. In this situation, if one location measurement device calculates the location of the target terminal, information on the calculated location may be transmitted to one or more remaining location measurement devices for sharing. In this process, the base station 250 can perform communication with the target terminal 210 through an established link, enable the target terminal 210 to transmit an uplink signal, and to do this, transmit uplink resource assignment information to the target terminal 210. The location measurement devices shown in FIG. 2 may be similar to the signal measurement device shown in FIG. 1. It should be noted that any of signal measurement devices described herein may be applicable to the signal measurement devices of FIG. 2.

The location measurement device shown in FIG. 2 may be variously used for estimating a location of the target terminal 210. In some embodiments, without using the location measurement server, location measurement devices can share respective measurement information for the target terminal 210 with one another through communication, and based on this, measure a location of the target terminal 210. In this situation, if only one or more location measurement devices of multiple location measurement devices calculate the location of the target terminal, the one or more location measurement devices can transmit information on the calculated location to the remaining location measurement devices for sharing.

The location measurement device can measure a signal transmitted by the target terminal 210, and based on this, acquire information on the presence or absence of the target terminal 210, location information, a distance of the target terminal 210 from the location measurement device, and the like. In this process, the location measurement device can measure an intensity of a signal transmitted by the target terminal 210, a time delay, and the like.

When a location measurement device according to aspects of the present disclosure measures an uplink signal from a target terminal, it is very important to acquire information on when the uplink signal from the target terminal is transmitted. Even when the location measurement device acquires uplink resource assignment information, if the location measurement device does not know when this signal is received, complexity of the location measurement device for detecting and measuring this may significantly increase, or a performance of the location measurement device may become poor. In order to know when an uplink signal is transmitted, it is very important for a location measurement device to acquire timing synchronization including a frame boundary of an uplink signal transmitted by a target terminal 210. In the present disclosure, there is provided a method of enabling a location measurement device or a signal measurement device according to aspects of the present disclosure to efficiently acquire timing synchronization including a frame boundary of an uplink signal transmitted by a target terminal 210.

There is provided a method of enabling the location measurement device or the signal measurement device to acquire timing synchronization including a frame boundary for an uplink signal transmitted by a target terminal. Further, it is required to acquire number information of each frame to know which frame an uplink signal is transmitted in. In the case of the LTE system, one frame has a length of 10 ms. Further, System Frame Number (SFN) has numbers between 0 and 1023 corresponding to respective frames.

A location measurement device according to aspects of the present disclosure can set a frame boundary of an uplink signal by adding a predetermined value of offset to a frame boundary region of a downlink signal received from a serving cell that communicates with a target terminal. Such a predetermined value of offset may be set to a positive value, a negative value, or 0. According to this, an SFN value of a downlink signal from the serving cell that communicates with the target terminal can be set together.

The location measurement device can set a detection window for an uplink signal from the target terminal. The detection window can be set by adding a predetermined value of offset at a time at which downlink from the serving cell is received, and determining a time window size based on this; thereby, signal detection for the time window can be performed.

Figure 3:
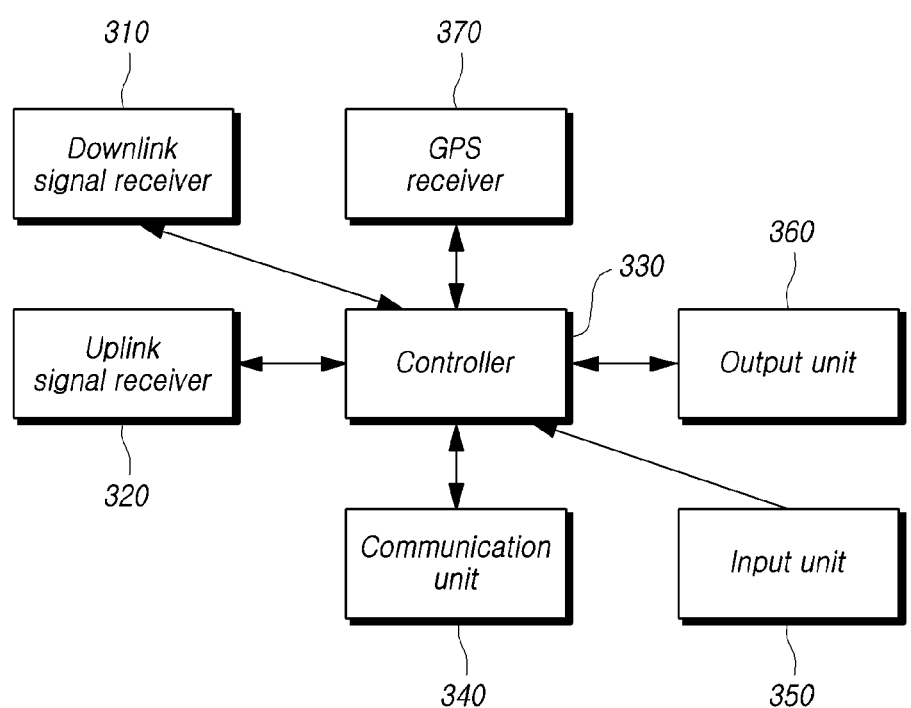
FIG. 3 illustrates an example of a location measurement device for location measurement according to one aspect of the present disclosure.

FIG. 3 illustrates a configuration of a location measurement device according to one aspect of the present disclosure. FIG. 3 illustrates an example structure of the location measurement device. As described above, it should be noted that location measurement devices and signal collection devices described herein are conceptually equal devices.

Referring to FIG. 3, a location measurement device according to one aspect of the present disclosure includes one or more downlink signal receivers 310 and one or more uplink signal receivers 320 to receive a signal from a mobile communication system. Further, the location measurement device includes a controller 330 for processing the received signal. Optionally, the location measurement device may include a communication unit 340 for performing communication with a base station, a location measurement server, or one or more other location measurement devices, a GPS receiver 370 for performing synchronization with an absolute time, an input unit 350 for receiving an input from a user, and a display 360 displaying information processed by the controller 330.

Embodiments described herein are discussed based on the LTE system; however, it should be noted that the embodiments may be easily applied to any other wireless communication systems. The downlink signal receiver 310 and the uplink signal receivers 320 may be an LTE downlink receiver and an LTE uplink receiver, respectively. Embodiments described herein are discussed based on the LTE system; however, it should be noted that the embodiments may be easily applied to any other wireless communication systems. That is, if a communication system in which a call of a target terminal is established is a GSM or W-CDMA system, the downlink signal receiver 310 and the uplink signal receiver 320 are implemented as a downlink receiver and an uplink receiver of the GSM or W-CDMA system, respectively.

The LTE downlink receiver acquires time synchronization to the system by capturing an LTE downlink signal in an initial stage, and obtains an ID of an associated base station, system information, and the like. Further, the downlink receiver can receive control information transmitted by the base station to a target terminal. The LTE uplink receiver can detect a transmission signal from the target terminal based on information on an uplink transmission resource assigned to the target terminal, and calculate an arrival time of the signal, signal power, and the like.

In the above process, the uplink resource assignment information for the target terminal can be received via the downlink receiver; however, embodiments described herein are not limited thereto. For example, the uplink resource assignment information for the target terminal may be directly received from an associated mobile communication system. In another example, the uplink resource assignment information for the target terminal may be received through a location measurement server. In another example, a communication link with the target terminal may be established using resources (a time, a frequency, a code, and the like)

and transmission parameters that are defined in advance between the mobile communication system and the location measurement device.

The location measurement device shown in FIG. 3 can calculate a difference in respective times at which each of one or more location measurement devices receives an uplink signal from a target terminal by acquiring an absolute time reference. In the configuration of FIG. 3, to do this, one or more location measurement devices can acquire time synchronization based on a GPS signal received by the GPS receiver 370.

However, embodiments described herein are not limited thereto. For example, time synchronization may be acquired between different types of location measurement devices, or any other methods capable of identifying a difference in times (time delays) at which one or more uplink signals arrive may be used. In an example, time synchronization may be implemented by time aligned in advance between location measurement devices using a high-precision clock, or by any other schemes or techniques capable of calculating a relative difference in time. In another example, location measurement may be performed based on a time difference between a time at which a specific signal is received by an LTE downlink receiver and a time at which an uplink signal related to another user is received. Information on such a reception time or time delay may be transmitted to the location measurement server.

A signal from the GPS receiver shown in FIG. 3 may be used for measuring a location of the location measurement device. Information on absolute time through the GPS receiver may be acquired, and multiple location measurement devices can share such time information with one another.

In some embodiments, the location measurement device can use the communication unit 340, as a separate unit, for directly communicating with a location measurement server or a base station, or for directly communicating with one or more other location measurement devices. The location measurement device of FIG. 3 may include an output unit 360 such as a display for displaying a location of a target terminal to a user. Further, the location measurement device may include the input unit 350 for receiving an input from a user. It is possible to increase the accuracy of location measurement by allowing the user to manually input additional information such as information on a current location of the location measurement device through the input unit 350. It is possible to input information related to a target terminal and location measurement, through the input unit 350, and input a call establishment for the target terminal and commands etc. related to operations of the location measurement server. The location measurement device includes the controller 330 for controlling operations of the location measurement device. The controller 330 is connected to associated devices, units, or components, and configured to control an information reception, measurement, communication, an input and an output, and the like needed to implement embodiments described herein.

Figure 4:
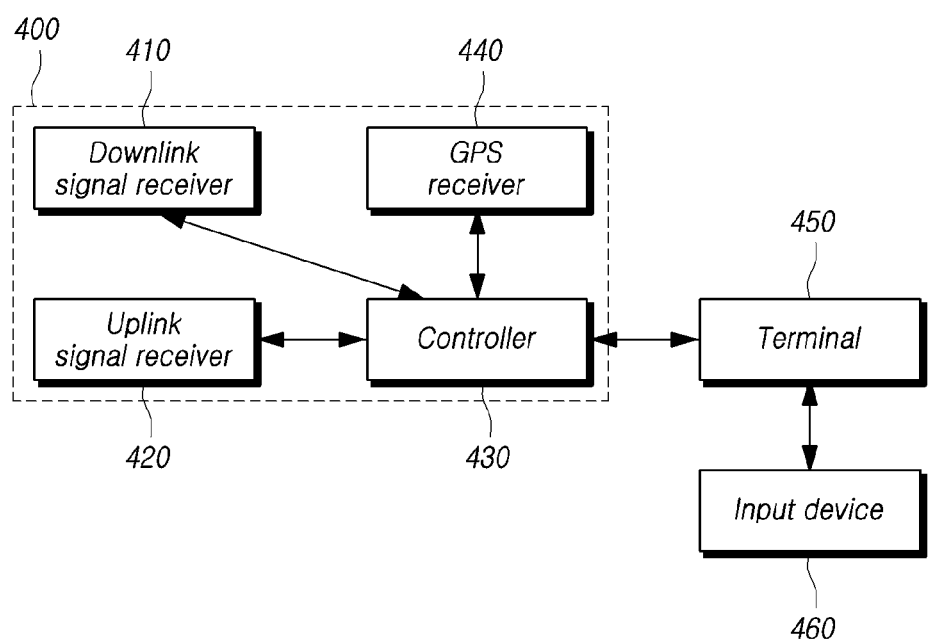
FIG. 4 illustrates an example of a location measurement device for location measurement according to another aspect of the present disclosure.

FIG. 4 illustrates a configuration of a location measurement device according to another aspect of the present disclosure. A difference of the configuration of the location measurement device shown in FIG. 4 from the configuration of the location measurement device shown in FIG. 3 is that some functions for communication with one or more other devices (a location measurement server or one or more other location measurement devices), displaying data or information, inputting data or commands, and the like are implemented by an externally-connected terminal 450 such as a smartphone, a tablet, or the like, so that the number of components included in the location measurement device can be reduced. The location measurement device 400 shown in FIG. 4 includes a downlink signal receiver 410, an uplink signal receiver 420, a controller 430, and a GPS receiver 440. Some functions of the location measurement device 400, such as a function of communication with other devices, a display function, an input function, and the like are implemented by using a wired or wireless connected terminal 450 such as a smartphone, a tablet, or the like. A portion indicated by dotted lines in FIG. 4 is a different type of location measurement device distinguished from the location measurement devices described above. A connection between the controller 430 and the terminal 450 shown in FIG. 4 may be performed through a wired connection such as a USB, or be wirelessly performed through WiFi, or the like. In another embodiment, in a situation where the location measurement device is equipped to be connected with other terminals or devices through wired and wireless connections, according to a situation, one desired connection may be selected and used. Further, input and output units for power-on/off, function setting, and the like and/or interfaces for an input and an output may be included in the location measurement device indicated by the dotted lines in FIG. 4. In some embodiments, GPS functionality equipped in a smartphone, a tablet, and the like may be implemented instead of the GPS receiver in the box indicated by the dotted lines in FIG. 4. In this situation, such GPS receiver may not be included in the location measurement device.

The devices shown in FIGS. 1, 3 and 4 can acquire timing synchronization in downlink by receiving a downlink signal from the mobile communication system. Thereafter, resource assignment information for a target terminal can be acquired, and based on this, uplink resource assignment information can be acquired. In this process, such information may be acquired by not only receiving a downlink signal from the mobile communication system, but also receiving resource assignment information from the mobile communication system. The location measurement device can detect an uplink signal based on such uplink resource assignment information, and based on this, determine whether a target terminal is placed.

In particular, in configurations of FIGS. 1 and 2, acquiring timing synchronization to the mobile communication system based on a signal received on downlink may lead timing synchronization in uplink not to be accurate. That is, while a signal from a terminal is transmitted to be synchronized in time to a base station, in the case of the location measurement device, there is a probability that a considerable amount of problems in timing synchronization may occur. Accordingly, there is required a scheme of accurately establishing timing synchronization to an uplink signal transmitted by a terminal.

Figure 5:
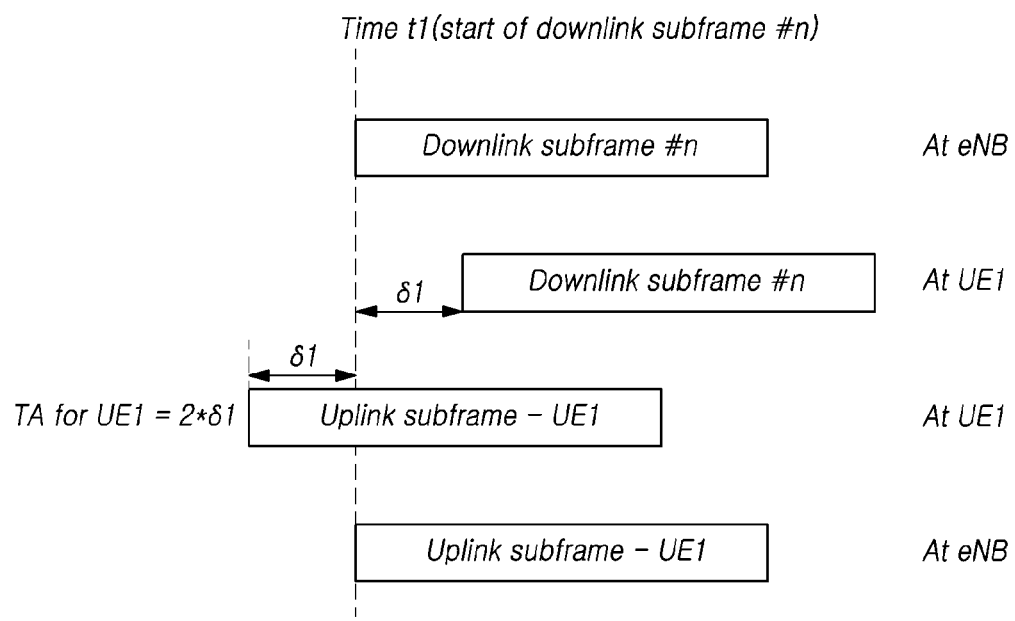
FIG. 5 illustrates downlink and uplink times in the LTE system.

FIG. 5 illustrates errors in timing synchronization caused in a location measurement device according to aspects of the present disclosure in a situation where a terminal establishes timing synchronization in uplink in the LTE mobile communication system.

As shown in FIG. 5, an LTE base station normally performs operations by configuring a downlink transmission time and an uplink reception time to be equal. Therefore, LTE terminals transmit uplinks in advance by a considerable amount of time, and according to locations of the terminals in one cell, transmission times may vary greatly. Likewise, a time at which the base station receives the corresponding signals may vary greatly.

In the LTE system, at an initial stage, terminals attempt initial access to a mobile communication base station through a random access procedure. In this situation, corresponding time delays may be different according to distances of the terminals from the base station. That is, respective times at which the base station receives uplink signals from the terminals may be different according to such respective situations of the terminals. In order to address such a difference in time delays according to distances from the base station, the base station can transmit a timing-correction command for an uplink signal to one or more terminals so that the base station can receive an uplink signal at a time. In general, a base station configures a downlink transmission time and an uplink reception time to be equal.

Embodiments herein are described with a focus on a situation where a base station configures a downlink transmission time and an uplink reception time to be equal. However, in some instances, base stations may set respective offsets corresponding to a downlink transmission time and an uplink reception time, and in this case, a location measurement device according to aspects of the present disclosure can acquire information on the offsets, and adjust a time for receiving an uplink signal from a target terminal by values of the offsets. Such an offset may be acquired in various manners. In one embodiment, such an offset value may be received from an associated base station. In this situation, a mobile communication network can transmit this value to a location measurement server, and then, the location measurement server can transmit it to the location measurement device. In another embodiment, such an offset value may be estimated by analyzing a timing-correction command received after a terminal has completed a random access procedure.

A signal transmitted by the mobile communication base station may arrive at a corresponding terminal with the time delay of $\Delta T1$. Accordingly, when the terminal transmits an uplink signal at this time, this signal may arrive at base station with the time delay of $2\Delta T1$. Taking account of this situation, the base station can instruct the terminal to transmit an uplink signal in advance by the time of $2\Delta T1$. In this situation, a time at which the terminal transmits a signal may vary according to where the terminal is located within one cell. From the base station perspective, terminals transmit signals at the time of $-\Delta T1$.

As shown in FIG. 5, a time at which a terminal transmits an uplink signal varies according to where the terminal is located within one cell. Even when the base station configures all uplink signals to be arrive at about the same time, as a location measurement device according to aspects of the present disclosure is placed in a location different from the base station, therefore, it is very important to establish uplink signal synchronization.

The location measurement device can determine what control information is transmitted from the base station to a terminal by receiving a forward signal, i.e. a downlink signal. In particular, by receiving control information connected with a radio network temporary identifier (RNTI) via a downlink signal receiver, the device of the present disclosure can determine whether an uplink signal may be transmitted, that is, whether the terminal may transmit the uplink signal to the base station based on the control information thereafter.

The term "RNTI" is used as a temporary ID of a terminal in a base station, and since information on which RNTI is assigned to a terminal is not provided, its anonymity can be maintained. Herein, the RNTI is employed for the purposed of identifying a terminal; however, embodiments of the present disclosure are not limited thereto. Herein, it should be noted that any ID temporarily assigned to a terminal in one base station or cell may be used for the same purpose or function as the RNTI.

For identifying locations for any one or more terminals, a location measurement device according to aspects of the present disclosure can acquire RNTI information and uplink resource assignment information based on the RNTI by receiving a downlink signal from a serving cell, and acquire whether a terminal with the RNTI is located in the vicinity of the location measurement device, and a location of the terminal. When the RNTI is used as identification information of a terminal, there is given an advantage of enabling the terminal whose location information is required to be measured at a specific time to be specified without leaking personal information of a user of the terminal (e.g. a phone number, a name, and a serial number).

In addition, instead of measuring location information for any terminal, the location measurement device can measure location information of only a terminal identified with a specific RNTI or phone number.

In the present disclosure, a base station or a mobile communication system can establish a communication line with a target terminal so that the target terminal can transmit an uplink signal. An information collection device or location measurement device according to aspects of the present disclosure can detect and measure such an uplink signal. Based on the uplink signal, it is possible to acquire information on whether a target terminal is located in the vicinity of a specific location measurement device, a time delay, a signal intensity, and the like. In the above process, the location measurement device can receive an RNTI and resource assignment information transmitted to the target terminal through a downlink control channel, and based on this, can determine whether an uplink signal that may be transmitted by the target terminal is present and measure this uplink signal.

In another embodiment, a mobile communication system can transmit information on an RNTI value, an uplink frequency, resources and transmission parameters, which is assigned to a target terminal, to a location measurement device according to aspects of the present disclosure, and based on this, the location measurement device can measure the presence or absence of an uplink signal from the target terminal and a time delay, reception power, and the like, and based on the measurement, measure a location of the target terminal. In this process, a location of the target terminal may be measured using information from one or more location measurement devices. In another embodiment, the mobile communication system can transmit information related to an uplink transmission of the target terminal to not only the location measurement device, but also a location measurement server, and in this situation, the location measurement server can signal this to the location measurement device. In another embodiment, one or more RNTIs or corresponding resource assignment may be defined in advance between a base station and one or more location measurement devices to be used thereafter. In one embodiment, a location measurement device according to aspects of the present disclosure can acquire information on a transmission time, a transmission channel, an MCS used for the signal, a scrambling code, and the like, of an uplink signal that may be transmitted by a target terminal, and based on this, can detect and measure the uplink signal from the target terminal.

In the present disclosure, one or more location measurement devices can transmit respective measurement information of a time delay, reception power, and the like, of an uplink signal transmitted by a target terminal to a location measurement server, and then, the location measurement server can measure a location of the target terminal. In another embodiment, two or more location measurement devices according to aspects of the present disclosure may share respective measurement information with one another through communication, and in this situation, any of the two or more location measurement devices can calculate a location of the target terminal. In another embodiment, one location measurement device can measure one or more signals from the target terminal at different locations, and transmit measurement results to the location measurement server to calculate a location of the target terminal. In another embodiment, one location measurement device can measure one or more signals from the target terminal at different locations, and calculate a location of the target terminal.

Information collection devices or location measurement devices according to aspects of the present disclosure may variously configured. In one embodiment, the information collection device or location measurement device can be configured as shown in FIG. 3. In another embodiment, the information collection device or location measurement device can be configured as shown in FIG. 4. A difference of the configuration of the location measurement device shown in FIG. 4 from the configuration of the location measurement device shown in FIG. 3 is that some functions for communication with one or more other devices (a location measurement server or one or more other location measurement devices), displaying data or information, inputting data or commands, and the like are implemented by an externally-connected terminal 450 such as a smartphone, a tablet, or the like, so that the number of components included in the location measurement device can be reduced. The configuration in the box indicated by dotted lines in FIG. 4 corresponds to the location measurement device, and in this configuration, the location measurement device can be collected with a smartphone, a tablet, or the like wirelessly and/or through a wired connection to use corresponding functions.

As common features in FIGS. 3 and 4, location measurement devices can collect uplink resource assignment information for a target terminal, and based on this, detect and measure an uplink signal from the target terminal. Further, the location measurement devices can not only detect and/or measure an uplink signal of the target terminal, but also perform communication for sharing such acquired information with a server or one or more other devices.

A location measurement device according to aspects of the present disclosure may be operated in a fixed location. In another embodiment, a location of the target terminal may be measured while a user or a moving object that desires to measure a location of a target terminal and carries the location measurement device moves.

In the present disclosure, the location measurement device may be expressed as a signal collection device, a signal measurement device, an information collection device or the like. It should be noted that embodiments described herein may be applied to any devices capable of detecting and/or measuring a signal from a target terminal, and based on this, identifying the presence or absence of the target terminal or a location of the target terminal.

A location measurement device according to aspects of the present disclosure is required to measure an uplink signal from a target terminal. In the case of the LTE system, it is normal that a base station configures a time at which the base station transmits a downlink signal and a time at which the base station receives an uplink signal to be equal. In a situation where a base station configures a time at which the base station transmits a downlink signal and a time at which the base station receives an uplink signal to be equal, FIG. 5 illustrates a relationship between such times and times at which a terminal receives the downlink signal and transmits the uplink signal. In the present disclosure, as shown in FIG. 5, embodiments herein are described with a focus on the situation where the base station configures a time at which the base station transmits a downlink signal and a time at which the base station receives an uplink signal to be equal. However, embodiments herein may be easily applied in a situation where a time at which a base station transmits a downlink signal and a time at which the base station receives an uplink signal to be different.

When such embodiments are used, the complexity of the location measurement device receiving and measuring an uplink signal from a target terminal can be reduced, and performance of the location measurement device for receiving the uplink signal from target terminal can be improved.

Figure 6:
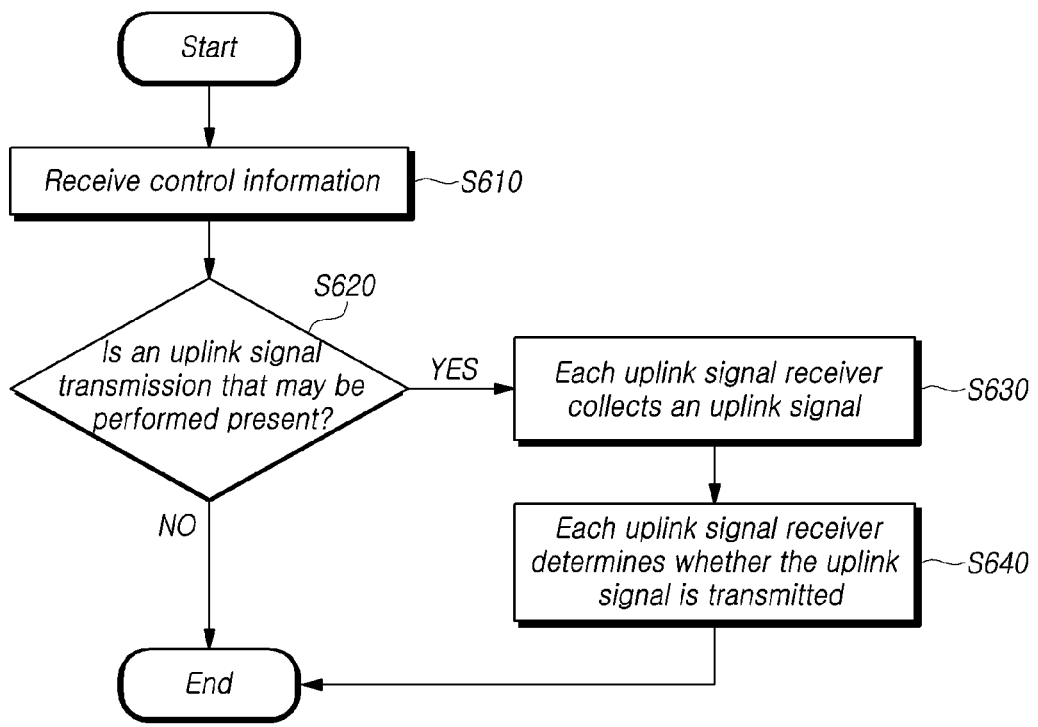
FIG. 6 is a flowchart to show schematic operations of a location measurement device according to another aspect of the present disclosure.

FIG. 6 is a flowchart to show schematic operations of a location measurement device according to another aspect of the present disclosure.

Referring to FIG. 6, operations of the device are discussed based on the LTE system as one example of mobile communication systems. The LTE system operates based on a TTI of 1 ms, and downlink control information may be transmitted from a base station to a terminal at each transmission time interval (TTI). Meanwhile, the procedure discussed below may be equally applicable to even any mobile communication systems other than the LTE system.

The location measurement device can receive control information transmitted from a base station to a terminal, at step S610.

The terminal can demodulate and decode one or more downlink signals in each TTI. In this situation, the downlink signal received by the terminal from the base station may be a control channel such as a PDCCH or a data channel such as a PDSCH. That is, in the LTE, control information may be normally transmitted through the PDCCH, and when the control information is transmitted through the PDSCH, the PDSCH may be received. In this case, the location measurement device may receive the PDCCH of downlink first, and thereafter, attempt to receive the PDSCH on which control information is transmitted.

The location measurement device can receive a forward signal transmitted from the base station to the terminal, that is, a downlink signal, and thereafter, identify when an uplink may be transmitted and which resource the uplink may be transmitted on, and which RNTI the terminal has at that time.

In addition, when the base station provides corresponding RNTI information, the location measurement device can receive control information of a target terminal with the corresponding RNTI, and based on this, can acquire corresponding uplink resource assignment information.

In another embodiment, an associated mobile communication system can provide the location measurement device with resource assignment information of the target terminal and parameters needed to receive an uplink signal from the target terminal. The location measurement device can acquire the uplink resource assignment information of the target terminal based on this information. The mobile communication system can directly transmit the information related to the uplink of the target terminal to the location measurement device, or can indirectly transmit it to the location measurement device through a location measurement server.

Each uplink signal receiver can identify whether an uplink signal that may be transmitted is present for the uplink resource identified in this manner, at step S620. This process may include determining whether a terminal that may transmit uplink is present, and which RNTI the terminal has, through control information transmitted on downlink. That is, when each uplink signal receiver determines that an uplink signal transmission may be performed, each uplink signal receiver can collect the uplink signal transmitted to the base station through the corresponding uplink resource, and based on the collected uplink signal, determine whether the uplink signal is transmitted. In another embodiment, the base station can instruct a target terminal to transmit an uplink transmission based on a resource assignment defined in advance, and provide in advance the location measurement device with information on the predefined resource assignment.

When it is determined that an uplink signal transmission may be performed, at step S620-Y, one or more uplink signal receivers included in the location measurement device can attempt to receive the uplink signal such that each uplink signal receiver collects the uplink signal, at step S630.

Further, each uplink signal receiver included in the location measurement device can determine whether the uplink signal is transmitted, at step S640.

On the other hand, when it is determined that an uplink signal transmission may not be performed, at step S620-N, the device waits until next control information is received without performing a separate uplink signal collecting operation.

This operation may be performed continuously in each TTI. Further, the location measurement device can identify the presence or absence of the terminal, a location of the terminal, and mobility information thereof based on the presence or absence of the uplink signal transmission, which is determined based on signals collected by each uplink signal receiver.

The above process may be performed based on information on an RNTI of the terminal. That is, the location measurement device can determine whether an uplink signal transmitted from only a terminal having a specific RNTI is transmitted, and identify the presence or absence of the terminal having the specific RNTI, and a location and mobility information of the terminal.

Figure 7:
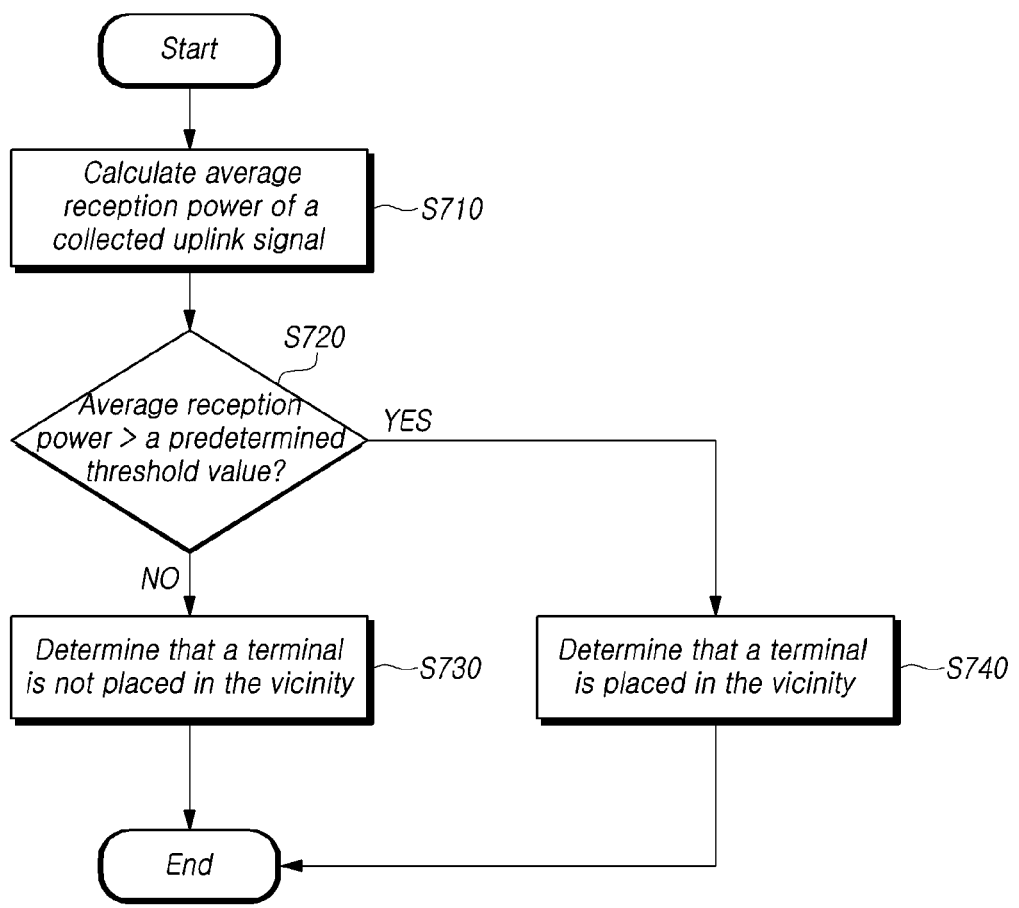
FIG. 7 is a flowchart to show operations of a location measurement device for detecting an uplink signal according to another aspect of the present disclosure.

FIG. 7 is a flowchart to show operations of a location measurement device for detecting an uplink signal according to another aspect of the present disclosure.

Referring to FIG. 7, the location measurement device can acquire transmission information of uplink based on a downlink signal received via a downlink signal receiver. Based on the acquired uplink transmission information, the device can collect an uplink signal transmitted from a terminal to a base station through a resource assigned on the uplink, and calculate average reception power of the collected signal, at step S710.

The device can compare a calculated average reception power value with a threshold value calculated or set in advance, at step S720. When the average reception power value is greater than the threshold value through the comparing, at step S720-Y, since the uplink signal has been received, the device can determine that a terminal whose location is required to be measured is placed in the vicinity of the device, at step S740. On the other hand, when the average reception power value is smaller than the threshold value, at step S720-N, since the uplink signal is not received, the device can determine that a terminal whose location is required to be measured is not placed in the vicinity of the device, at step S730. When it is determined that the terminal is placed in the vicinity of the device, at step S740, measurements resulting from measurement for the uplink signal of the target terminal can be used to calculate a location of the target terminal. In the above process, the location measurement device can measure a reception intensity of the uplink signal transmitted by the target terminal, a time delay, and the like.

In the above process, power of a reference signal, which is a pilot signal, transmitted over an uplink PUCCH or PUSCH may be used for calculating a reception power value of uplink. In another embodiment, power of a data signal transmitted over the uplink PUCCH or PUSCH may be used for calculating a reception power value of the uplink. Further, the presence or absence of the terminal and the location information of the terminal can be identified by combining power values of the reference signal and the data signal. Further, measurement may be performed using an SRS transmitted by the target terminal. In another embodiment, measurement may be performed using a RACH signal transmitted by the target terminal.

An important consideration in designing a location measurement device for performing the process of detecting and measuring an uplink signal from the target terminal is to acquire information on a time at which an uplink signal is received. In general, a mobile communication system can control an uplink transmission time through a timing-correction command so that uplink signals from terminals can be received at the same time. However, as a location measurement device according to aspects of the present disclosure may be located in a location different from the base station, there exist indefiniteness on received times. Therefore, in order to detect an uplink signal from a target terminal, and maximize an SNR of the received uplink signal, it is necessary to acquire timing synchronization for the uplink signal from the target terminal. Generally, a receiver performs search in a time window with a predetermined time to acquire timing synchronization. It is advantageous to minimize such a time window from complexity and performance perspectives. In the present disclosure, there is provided a method of configuring such a time window to be optimized.

A location measurement device according to aspects of the present disclosure can acquire its location information. This can be realized by using a GPS receiver included in the location measurement device. If the location measurement device is located in an area in which a GPS signal cannot be received, a user can manually input information on its location. In addition, the location measurement device can acquire information on a location of a base station of a serving cell communicating with a target terminal.

The term "serving cell" herein denotes a cell communicating with a target terminal; therefore, there is a probability that each location measurement device may not communicate with this serving cell, and cannot receive a signal therefrom. Thus, it should be noted that the serving cell defined herein may be different from that defined in the typical mobile communication systems.

In another embodiment, a search window may be variously set according to a location of a location measurement device according to aspects of the present disclosure. In another embodiment, a search window may be variously set according to a location of a serving cell. A distance between a serving cell base station and a location measurement device according to aspects of the present disclosure can be calculated based on the above information. A search window can be set based on such distance information.

The location measurement device can set a maximum distance for detecting a target terminal in advance. For example, the maximum distance of 1 km may be set for detecting a target terminal within 1 km, or the maximum distance of 3 km may be set for detecting a target terminal within 3 km. This value is referred to as "search radius" ds. According to a setting value of the search radius for such detection, a search window for an uplink signal from a target terminal may be variably set. Such a search radius may be variably set according to an estimated location of a location measurement device or a target terminal.

In addition, such a search radius may be variably set according to a service radius of a base station of a serving cell communicating with a target terminal. The location measurement device can acquire information on a radius of a serving cell, and based on this, variably set a corresponding search window.

A location measurement device according to aspects of the present disclosure can acquire information on a cell ID of a serving cell communicating with a target terminal and information on a location of an associated base station.

The location information of the base station may be transmitted from an associated mobile communication network to a location measurement server, and then, the location measurement server can transmit it to one or more location measurement devices. In a situation where one or more location measurement devices do not accurately identify the location information of the base station (e.g., as in a moving base station), each location measurement device measures an arrival time of a downlink signal from the base station, reception power, and the like, and transmits such measurement to the location measurement server. The location measurement server can calculate a location of the base station based on the measurement, and report location information through the calculation to the one or more location measurement devices.

In another embodiment, each location measurement device can share respective measurement results for an arrival time of a downlink signal from the base station, reception power, and the like, with one another, and based on these, calculate a location of the base station. The location of the base station calculated in this manner may be displayed on a display of the location measurement server. In addition, the location of the base station may be displayed on a display of the location measurement device or on a display of a mobile phone or portable device connected to the location measurement device.

Even when the location information of the base station has been acquired, when one or more location measurement devices or the location measurement server cannot acquire information on a cell ID of an associated serving cell, one or more location measurement devices in the location of the base station can analyze an LTE downlink signal, and based on results from the analyzing, can acquire a cell ID of the base station and frame boundary information of the downlink signal. The cell ID information acquired in this manner may be transmitted to the location measurement server to share with the remaining one or more location measurement devices. In another embodiment, location measurement devices can share desired information with one another by performing communication.

FIG. 8 illustrates an example of a reception time of an uplink signal from a target terminal when a location measurement device according to aspects of the present disclosure uses the LTE system. FIG. 8 illustrates a reception time at which a location measurement device receives a signal from a target terminal in a situation where the location measurement device is placed in a direction in which the target terminal is placed with respect to a base station. In this situation, when setting a detection window of the location measurement device, the detection window may be variably set according to information on an approximate location of the target terminal or information on a range of locations. For example, when the target terminal is placed on an opposite side of the base station from the location measurement device, a size of a detection window that can be desirably set to detect the target terminal in this situation may be greater than a size of a detection window that can be desirably set in the illustration of FIG. 8.

FIG. 8 shows times in a situation where the base station configures a time at which the base station transmits a downlink signal and a time at which the base station receives an uplink signal to be equal. FIG. 8 shows a distance d1 between the base station and a location measurement device according to aspects of the present disclosure. Here, c is propagation velocity, that is, the velocity of light, and ds is a maximum distance from a target terminal whose location is required to be measured by the location measurement device. That is, ds denotes an estimated maximum distance between the location measurement device and the target terminal that is measurable.

In the upper view of FIG. 8, the target terminal is between the base station and the location measurement device. In this instance, a time at which uplink transmitted by the target terminal is received by the location measurement device is $-2d1/c+2ds/c$.

On the other hand, in the lower view of FIG. 8, the location measurement device is between the base station and the target terminal. In this instance, a time at which uplink transmitted by the target terminal is received by the location measurement device is $-2d1/c$.

For reference, when the target terminal and location measurement device are placed at the same distance from the base station, and the distance is ds, a time at which uplink transmitted by the target terminal is received by the location measurement device is $-2d1/c+ds/c$.

To summarize, the location measurement device is required to at least search a window between $[-2d1/c, -2d1/c+2ds/c]$ to detect a signal from the target terminal. When this is separated into components of d1 and ds, a search window is required to be configured to include between $[0, 2ds/c]$ with respect to $-2d1/c$. That is, a search window $[0, 2ds/c]$ with a size of $2ds/c$ is required for a distance ds at which the location measurement device can search the target terminal, and in addition to this, by reflecting the distance between the base station and the location measurement device, the search window can be adjusted by the location $-2d1/c$.

Considering that measurement errors are present in each device and multiple paths are present, it may be desirable to add some values to both ends of the above resulting window. That is, a window of $[-2d1/c-W1, -2d1/c+2ds/c+W2]$ may be configured. Here, W1 and W2 are values more than or equal to 0. As described above, the center of the search window of the location measurement device becomes $-2d1/c$, and it therefore appears that a center of a search window may vary according to a distance between the base station and the location measurement device. A size of a search window may be variably configured according to a distance at which an object to be searched is located.

However, when it is determined that a distance ds at which the location measurement device can search the target terminal is greater than d1, a signal from the target terminal may be arrive at the location measurement device at a time different from that shown in FIG. 8. For example, when the target terminal is placed at an opposite side of the target terminal from the location measurement device, and they are therefore located in order of the target terminal, the base station, and the location measurement device in a straight line, the target terminal may transmit a signal at a time of −d2/c, and this may arrive at the base station at a time of 0. Here, d2 is a distance between the target terminal and the base station. This signal may arrive at the location measurement device placed on the opposite side of the base station from the target terminal at a time of d1/c. Thus, when a distance ds at which the location measurement device can search the target terminal is configured to be greater than d1, a search window of the location measurement device may be set to [−2d1/c−W1, d1/c+W2]. Here, W1 and W2 are values more than or equal to 0. If it is sure that the target terminal is placed on the opposite side of the base station from the location measurement device, a corresponding search window may be set to [−W1, d1/c+W2]. In this manner, the location measurement device can variably set a corresponding search window according to a location of the target terminal and a distance ds for searching the target terminal.

An important feature of resulting from the illustration of FIG. 8 is that in order for the location measurement device to set an efficient uplink search window, information on the distance d1 between the base station and the location measurement device and information on a radius ds at which the location measurement device can find the target terminal are needed. Further, information on a range of locations of the target terminal is also needed.

In the present disclosure, there are proposed methods of calculating a distance between the location measurement device and the base station, and based on this, setting a search time window for searching a signal from a target terminal by a location measurement device. In methods according to embodiments described herein, a mobile communication system can provide a location measurement device with location information of a base station, and the location measurement device can measure a location of the location measurement device and based on this, calculate a distance d1 between the base station and the location measurement device. In this process, the mobile communication system may directly provide the location of the base station to the location measurement device. In another example, the mobile communication system may provide the location of the base station to a location measurement server, and then, the location measurement server can transfer this to the location measurement device. A location of each base station that have been stored in the location measurement server may be transferred to the location measurement device.

In another example, the location measurement device may measure propagation attenuation of a downlink signal, and based on this, measure a distance between the base station and the location measurement device.

As shown in FIG. 3 or 4, the location measurement device according to embodiments described herein may include a GPS receiver, or be connected to a terminal including a GPS receiver wirelessly or through a wired connection. In this process, the location measurement device can calculate a value of d1 based on its own location measured by the GPS receiver and location information of the base station. The controller in the illustration of FIG. 3 can calculate this value. In the illustration of FIG. 4, the controller can calculate the d1 value, or a connected smartphone or tablet can calculate this value, and transmit this to the controller so that the controller can set a corresponding search window.

In the process of calculating a distance d1 between a base station and a location measurement device, there is a probability that the location measurement device may be placed in an area where a GPS receiver cannot normally operate. In this situation, a user can input a location of the location measurement device using an input unit or input device shown in FIG. 3 or 4 so that the location can be represented on a map, or the location of the location measurement device can be identified by inputting the location in any other ways. In another example, PDR, geomagnetic sensors, gyro sensors, or the like may be used to determine or calculate the locations or distances described above.

Various parameters may be needed for calculating a searchable distance ds of a target terminal. For example, such parameters may include transmission power of a target terminal, a propagation environment of an associated cell, a location and a reception performance of a location measurement device, and the like. The searchable distance may be set according to various scenarios.

In one embodiment, a base station of a mobile communication system may calculate a searchable distance, and then transmit the calculated distance to a location measurement device. In another embodiment, the base station may signal the calculated distance to a location measurement server, and then, the location measurement server can signal it to the location measurement device. In this instance, the base station can calculate such a searchable distance ds considering transmission power from a target terminal, a propagation environment of a cell, and the like. In the above process, the base station may receive a report from the target terminal such as a power headroom report, and use for the transmission power of the target terminal.

In another embodiment, the location measurement device may calculate the searchable distance ds. In this instance, the calculation of the searchable distance can be performed based on the number of reception antennas of the terminal, types of the antennas, an around propagation environment and a location of the location measurement device, and the like. In this process, the searchable distance can be calculated by assuming power transmitted by the target terminal as a predetermined value. In another example, a searchable distance may be set in advance considering a reception performance of the location measurement device. For example, the searchable distance may be set considering a maximum distance at which a location measurement device can detect a terminal.

However, a more efficient method comparing with the above methods is that a searchable distance is calculated by combining information on transmission power of a target terminal that is received from a mobile communication system and information on a reception performance of a location measurement device, and the like. The transmission power information of the target terminal may be transferred from the mobile communication system to the location measurement device. In another example, the mobile communication system may provide the transmission power information of the target terminal to a location measurement server, and then, the location measurement server can transfer this to the location measurement device.

In another embodiment, a location measurement server may calculate a searchable distance, and then provide this to the location measurement device. To do this, the location measurement server can periodically receive information on transmission power from a target terminal from the mobile communication system. Further, to do this, information on types of location measurement devices and respective reception performances of one or more location measurement devices may be stored. The above information may be transferred through a registering process performed when location measurement for the target terminal is initiated. Further, information on a propagation environment of an area in which a target terminal is located and a size of an associated cell, etc. may be also stored in advance. Based on this, a searchable distance of a target terminal can be calculated, and results from the calculation can be provided to the location measurement device.

According to methods described above, a mobile communication system provides a location of a base station, and based on this, a location measurement device sets a search time period for searching a target terminal. To do this, there has been used a method in which the mobile communication system provides the location of the base station to the location measurement device. However, in actual situation, there is a probability that these methods may not be normally performed. One example for this is a situation where an associated base station moves. In another example, there is a situation where a location measurement device cannot measure its location. In these situations, the mobile communication system can provide a service radius dR of an associated cell to the location measurement device, and the location measurement device can set a search window based on this. The mobile communication system can provide information on the service radius dR of the cell to a location measurement server, and then, the location measurement server can provide this to the location measurement device. Further, the location measurement server can calculate a search window based on the information on the service radius dR of the cell, and provide this to the location measurement device.

Embodiments described herein relate to setting a search window of a location measurement device for detecting a target terminal. According to embodiments described herein, a search window may be variously set according to a location of a base station, a range of locations of a target terminal, a location of a signal measurement device, a distance between the base station and the signal measurement device, a range of detection, and the like. The setting of the search window can be calculated by a location measurement server, and then transferred to each location measurement device. However, in another embodiment, the location measurement server can provide all of a part of such information to the location measurement device, and based on this information and information acquired through the measurement of location measurement device, the location measurement device can set a search window.

FIG. 9 illustrates an example of search window setting for a signal from a target terminal based on a service radius dR of a cell according to one aspect of the present disclosure. FIG. 9 shows a propagation arrival time in a situation where a target terminal is located in a direction where a signal measurement device is located with respect to a base station.

Referring to FIG. 9, a reception time is earliest when the target terminal and the location measurement device are located to be adjacent to a cell boundary area. The reception time in this instance becomes $-2dR/c$ with respect to a reception time of the location measurement device. On the other hand, a reception time becomes 0 when the location measurement device is located to be adjacent to the base station. Thus, a search window of the location measurement device is required to include $[-2dR/c, 0]$. In actual, the location measurement device can set a search window to $[-2dR/c-W1, W2]$. Here, W1 and W2 are numbers more than or equal to 0.

However, when the target terminal is located on an opposite side of the base station from location measurement device, a search window of the location measurement device may be needed to be set to $[-2dR/c-W1, dR/c+W2]$. If it is sure that the target terminal is placed on the opposite side of the base station from the location measurement device, a corresponding search window may be set to $[-W1, dR/c+W2]$. This may be variously set according to a range of locations of the target terminal, a range of detection of the location measurement device, and the like.

In this process, the base station may set a transmission time of a downlink and a reception time of an uplink to be different from each other. When the downlink transmission time and uplink reception time are set so that a difference between these two times can be present, the base station can provide this to a location measurement server and the location measurement device, and enable a target terminal search window to be adjusted by using this. If the base station configures the reception time of the uplink to be late by $\Delta Toff$ comparing to the transmission time of the downlink, the base station can provide this to the location measurement server or the location measurement device, and thus, enable a corresponding search window to be configured considering this. In this instance, the search window of the location measurement device moves overall by $\Delta Toff$ in the time axis. In this instance, a moving direction is a direction in which the number increases.

The location measurement device may be placed in a fixed location. In this instance, information on a distance between an associated base station and the location measurement device may be stored in a storage device of the location measurement device. In this manner, a corresponding search window may be calculated based on a stored search window. In another embodiment, radius information of the base station may be stored in the location measurement device. In the same manner as this, a search window may be stored in advance in the storage device. In this process, a distance from a base station or a service radius of a cell for each frequency band may be stored in advance. This is because a location of a base station or a cell radius may be different for each frequency band. Further, information on search windows for each frequency may be stored in advance. In this manner, when a location measurement device according to aspects of the present disclosure operates in a frequency band different from another, a corresponding search window may be set based on stored information on a cell (a location of a base station or a radius of the cell) or information on search windows. Thereafter, whenever an operation frequency of the location measurement device is changed, a signal from the target terminal may be searched based on the stored information on the cell or the information on the search window. Further, whenever an operation frequency of the location measurement device is changed, a location measurement server can receive the information on the window and progress to detect an uplink signal.

The radius of the serving cell may be determined based on an approximate location of the cell. For example, the cell radius may be variously set according to whether the cell is located in an urban area, a rural area, a mountain area or a coastal area. Through this process, an approximate radius of a serving cell may be acquired simply and stably. That is, even when information on radii of all cells are not stored, an approximate radius of a serving cell may be set based on only a large range of areas such as an urban area, a rural area, a mountain area and a coastal area, and based on this, a corresponding window may be set.

Such setting of the search window may be also available in the WCDMA system. Generally, in the W-CDMA system, uplink can be transmitted relative to at a time at which a terminal receives downlink. Thus, a reception time of uplink is operated without the alignment of an associated base station in the same manner as the LTE system. A reception time of a location measurement device in this instance is illustrated in FIG. 10.

FIG. 10 illustrates an example of setting a time window for detecting an uplink signal when a location measurement device is used in the W-CDMA system according to another aspect of the present disclosure.

As shown in FIG. 10, in this setting, a search time of a target terminal may be set to [0, 2ds/c]. This can be set regardless of a distance d1 between a base station and a location measurement device. In actual, when this is applied to the location measurement device, a corresponding window may be set to [−W1, 2ds/c+W2]. Here, W1 and W2 are numbers more than or equal to 0.

When the location measurement device desires to detect the target terminal located on an opposite side of the base station from the location measurement device, a corresponding window may be set to [−W1, 2d2/c+d1/c+W2]. Here, d2 is a distance between the target terminal and the base station.

In addition, when ds is not accurate or an associated cell is a small cell, a search window may be set to [−W1, 2dR/c+W2] using dR rather than ds. When this is used, while complexity may increase somewhat, there is an advantage of enabling even a target terminal at a longer distance to be detected. When it is desired to detect a signal from the target terminal located on an opposite side of the base station from the location measurement device, a corresponding search window may be set up to [−W1, 3dR/c+W2]. This corresponds to a situation where the target terminal and the location measurement device are located in a cell boundary area, and the target terminal, the base station, and the location measurement device are located in a direct line in order of the target terminal, the base station, and the location measurement device.

A location measurement server can acquire location information of the base station and a service radius of an associated cell, and provide these to the location measurement device. In another embodiment, the location measurement server can calculate a corresponding search window and signal the calculated search window to the location measurement device. The location measurement server can store the location information of the base station and the service radius of the cell in an internal database in order to be used thereafter. That is, the location measurement server can receive only an ID of an associated base station from a mobile communication network, and based on this, acquire or calculate location information of the base station or a service radius of a corresponding cell from stored data, such as a database holding relevant data or information: In another embodiment, such information may be acquired from the mobile communication network.

In another embodiment, the location measurement device can hold all of the location information of the base station and the service radius of the cell. When the location measurement device is in a situation in which the location measurement device can identify its own location information, a corresponding search window may be set based on a distance between the base station and the location measurement device. However, when the location measurement device is in a situation in which it is difficult for the location measurement device to identify its own location information, a corresponding search window may be set based on the service radius of the cell. According to these situations, a corresponding search window may be variably set.

In the present disclosure, there are provided methods of a location measurement device for setting a search window of an uplink receiver for detecting an uplink signal from a target terminal. According to embodiments described herein, a search window of an uplink receiver may be set with respect to a reception time of a downlink signal of a cell to which a target terminal belongs.

However, according to situations, there is a probability that a location measurement device according to aspects of the present disclosure is located in an area in which a downlink signal of a cell to which a target terminal belongs cannot be normally received. In this situation, even when the location measurement device is placed in an area where a target terminal can be detected, there is a probability that the location measurement device does not normally detect the target terminal as failing to receive a downlink signal. Embodiments described herein provide methods for addressing this issue.

According to embodiments described herein, each location measurement device can report a time difference between a time at which a downlink signal of a serving cell is received (i.e. a downlink signal of a cell to which a target terminal belongs) and a reference time of GPS to a location measurement server. Based on this, the location measurement server can calculate information on the time difference between the downlink signal from the cell to which the target terminal belongs and the reference time of GPS, and provide this to each location measurement device. The location measurement device can identify a time of the downlink signal from the cell to which the target terminal belongs based on the information on the time difference, and based on this, set a detection window an uplink signal from the target terminal.

Figure 11:
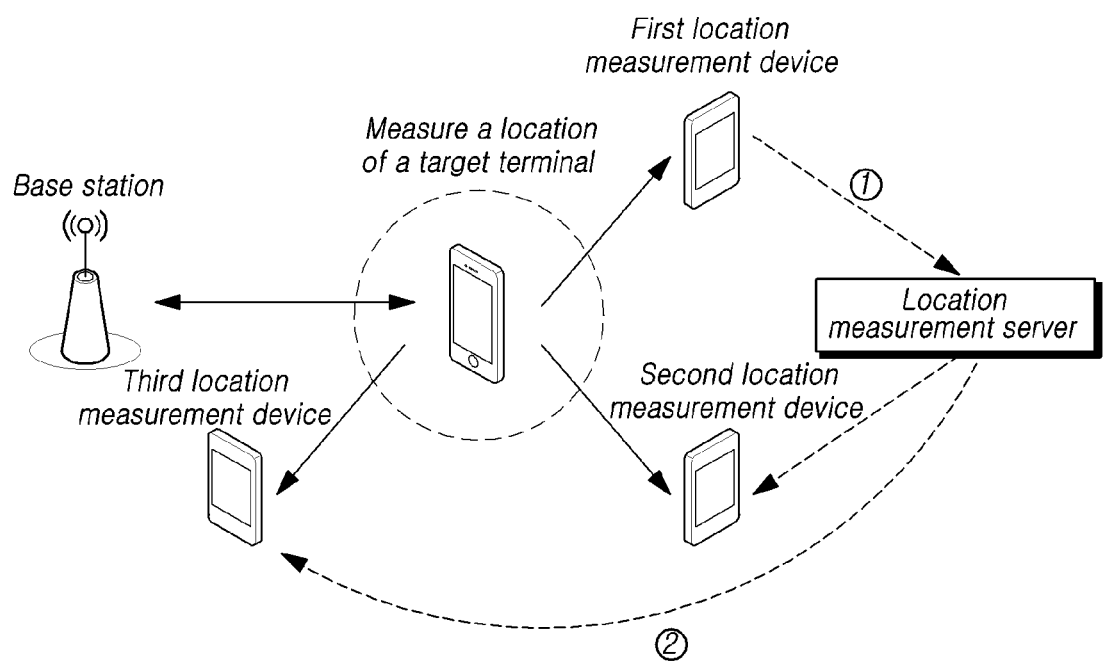
FIG. 11 illustrates an example method of sharing information on a downlink reception time for acquiring time information for uplink according to one aspect of the present disclosure.

FIG. 11 illustrates an example method of sharing information on a downlink reception time for acquiring time information for uplink according to one aspect of the present disclosure.

Referring to FIG. 11, a mobile communication base station can configure a target terminal to transmit an uplink signal. A plurality of location measurement devices is placed in the vicinity of the target terminal and attempts to detect an uplink signal from the target terminal. At this instance, there is a probability that one or more location measurement devices normally receive a downlink signal from a base station of a cell to which the target terminal belongs, and one or more remaining location measurement devices do not properly receive it. Such an instance where the downlink signal cannot be properly received may include a situation where the location measurement device cannot detect the signal from the base station, or a situation where even when the signal is detected, the signal from the base station has a poor reliability as the signal is not received with a sufficient SNR. In the illustration of FIG. 11, it is assumed that a first location measurement device normally receives a downlink signal from the base station, and a second location measurement device and a third location measurement device do not normally receive it. In this instance, the first location measurement device can measure information on a time at which the downlink signal from the base station is received, and provide information on the measurement to a location measurement server. Such measurement may be performed by measuring a difference between the time at which the downlink signal from the base station is received and a time of GPS, and providing information on the measurement to the location measurement server.

In the above process, the first location measurement device can transmit reception time information of a downlink signal of a base station communicating with the target terminal to the location measurement server, and based on this, the location measurement server can calculate a transmission time of the downlink signal from the base station or an arrival time of the downlink signal of the base station at the location measurement device and provide the calculated information to other location measurement devices. In one embodiment, the location measurement server can calculate the transmission time of the signal from the base station using the following Equation 1 based on the downlink reception time of the first location measurement device.

A downlink transmission time of a serving base station=a downlink reception time of a location measurement device−a propagation delay between the base station and the location measurement device. [Equation 1]

In the above process, a propagation delay value between the base station and the location measurement device may be calculated using a value obtained by dividing a distance between the base station and the location measurement device by the velocity of light.

According to embodiments described above, the location measurement server has calculated information on the downlink transmission time of the serving base station; embodiments described herein are not limited thereto. For example, the location measurement server may transmit the location information of the base station to each location measurement device, and based on this, each location measurement device can calculate the downlink transmission time of the serving base station.

As described above, the location measurement device can measure a time at which a downlink signal of a serving base station is received or a time at which the downlink signal of the serving base station is transmitted, relative to a GPS time, and transmit the acquired measurement to the location measurement server. The location measurement server can calculate a time at which a downlink signal of the serving base station is transmitted or a time at which the downlink signal is received based on information received from each location measurement device, and transmit information obtained by the calculation to each location measurement device. When the location measurement device receiving such information from the location measurement server cannot detect a signal of the serving base station or detects the signal with poor reliability, the location measurement device can estimate a time at which an uplink signal from the target terminal may be received based on the information on the reception time of the downlink signal from the serving base station received from the location measurement server, and based on this, set a corresponding detection window and detect an uplink signal from the target terminal.

The location measurement server can calculate a downlink transmission time of the serving base station or a downlink reception time at the location measurement device based on information received from each location measurement device: and transmit the calculated information to each location measurement device.

In the above process, a method of calculating a transmission time of the base station may be performed such that respective downlink transmission times of the serving base station measured by each location measurement device may be calculated based on information transmitted by each location measurement device, and then, a value obtained by averaging these may be set as a representative value. In another embodiment, the earliest value or latest value of respective values of downlink transmission times may be set as a representative value. In another embodiment, a representative value may be set based on measurement results from a location measurement device receiving the strongest signal. In another embodiment, the earliest transmission time among location measurement devices receiving a signal with a SNR greater than or equal to a specific threshold value may be used. Even when the location measurement server calculates a downlink reception time of the serving cell based on measurement values transmitted by each location measurement device, a representative value may be calculated using a similar method and the calculated representative value may be transmitted to each location measurement device.

When location measurement devices are widely distributed, respective reception times acquired by the location measurement devices may be different. The location measurement device can calculate a transmission time of a serving cell base station and provide the calculated transmission time to each location measurement device. The location measurement device can calculate a reception time of a downlink signal based on a value of a distance between the base station and the location measurement device, and based on this, set a search window for detecting a signal from the target terminal. In another embodiment, the location measurement server can calculate values of respective reception times at each location measurement device, and provide the calculated reception time values to location measurement devices. Each location measurement device can set a corresponding a search window based on the reception time value.

However, in general, a situation where location measurement devices are widely distributed does not often occur, therefore, in most situation, a transmission time of a downlink signal of the base station and a reception time of the location measurement device almost coincide. Therefore, the location measurement device may be allowed to set a search window of a target terminal using any of a downlink transmission time of the base station and a reception time at the location measurement device without causing a big problem. Therefore, a location measurement device according to aspects of the present disclosure can acquire information on a downlink transmission time of a serving cell or a reception time of the location measurement device, and based on this, set a search window for detecting an uplink signal from the target terminal.

Figure 12:
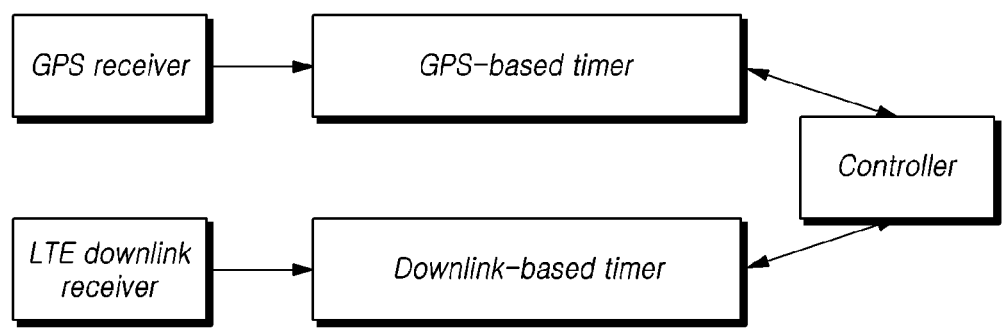
FIG. 12 illustrates an example method of acquiring information on a downlink time of a serving cell for detecting an uplink signal from a target terminal according to one aspect of the present disclosure.

FIG. 12 illustrates an example method of acquiring information on a downlink time of a serving cell for detecting an uplink signal from a target terminal according to one aspect of the present disclosure.

Figure 13:
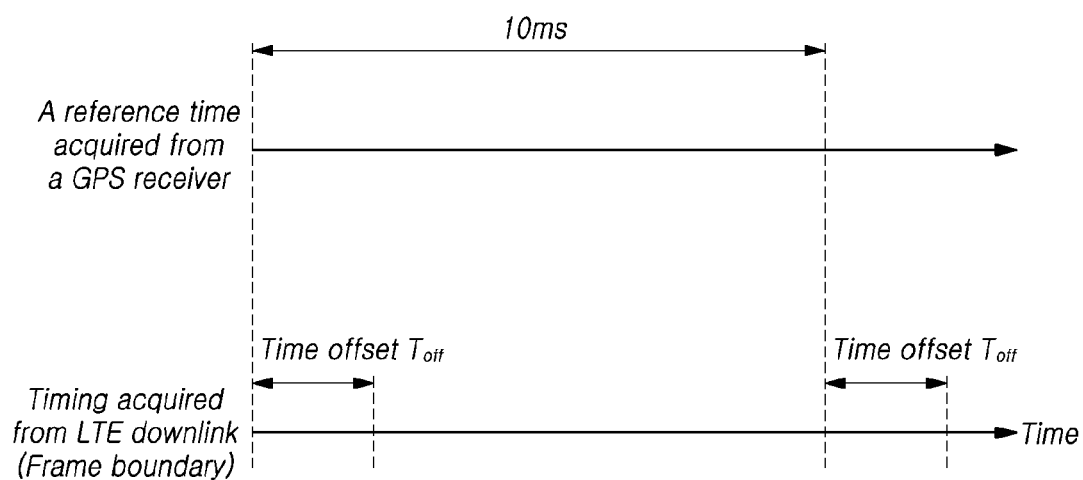
FIG. 13 illustrates an example of a location measurement device according to one aspect of the present disclosure.

Referring to FIG. 12, a location measurement device can include a GPS-based timer and a timer based on an LTE downlink signal to measure time. FIG. 13 illustrates that in the two timers, a 10 ms boundary is represented. There is a difference of a Toff value between the two timers. A location measurement device according to aspects for the present disclosure can read the Toff value, and based on this, identify a difference between an LTE downlink reception time and a time according to the GPS-based timer.

FIG. 13 illustrates embodiments related to an implementation of the location measurement device according to one aspect of the present disclosure.

Referring to FIG. 13, the location measurement device can include a GPS receiver and an LTE downlink receiver.

The location measurement device can include a reference timer measuring time received from the GPS receiver, and a timer measuring time received from the LTE downlink receiver. A controller of the location measurement device can read or write information on at least one of the timers. A method of the location measurement device for acquiring a Toff value for a serving cell of a target terminal may be performed such that the controller reads values of the two timers at a desired time, and based on a difference value between them, calculate the Toff value. In another embodiment, a value of one of the two timers at a frame boundary time of the other can be obtained, and based on this, a corresponding Toff value may be calculated.

In addition, one of the two timers may be selected, and based on the selected timer, a signal for providing a transmission time of an uplink signal of a target terminal (or a reception time or transmission time of a downlink) can be generated. Based on this, an uplink signal detection window of a target terminal can be set, and based on the window, a signal from the target terminal can be detected.

For example, when the location measurement device stably receives a downlink signal of a serving cell of the target terminal, the location measurement device can detect and measure an uplink signal from the target terminal using the timer based on the downlink signal. On the other hand, when the location measurement device cannot normally detect a downlink signal of the serving cell (or a downlink signal of a cell synchronized with this) of the target terminal, or in even a situation where the downlink signal is detected, when an intensity of the signal or a reception performance is poor, the location measurement device can receive information on a difference between a downlink time of the serving cell and a GPS time, and based on this, detect and measure a signal from the target terminal based on the GPS-based timer. However, the location measurement device may be located in an area where the location measurement device cannot detect both a downlink signal of the serving cell and a signal from the GPS receiver. Thus, what is desired is methods for acquiring an uplink timing synchronization for a target terminal in even such situations and setting a search window.

To do this, the location measurement devices can acquire information on a time difference of a frame boundary transmitted by LTE base stations, and based on this, acquire time synchronization to an associated serving cell. To do this, each location measurement device can determine one reference cell through respective downlink receiver. The location measurement device can measure offsets of respective downlink signals of neighboring cells with respect to a frame boundary of the reference cell and transmit the offset information to a location measurement server. The reference cell may be determined as a corresponding serving cell communicating with a target terminal. However, when a reception level of a signal of the serving cell is unstable, that is, less than or equal to a predetermined value, a cell from which the strongest downlink signal is received may be set as a reference cell. In another embodiment, a cell from which the strongest downlink signal is received may be always set as a reference cell. The location measurement device can measure or determine an ID of the reference cell, an ID of a neighboring cell, and information on an offset of a frame boundary, and provide the obtained information to the location measurement server. In another embodiment, each location measurement device can directly share with the location measurement server or other one or more location measurement devices through performing communication wirelessly or through a wired connection.

Figure 17:
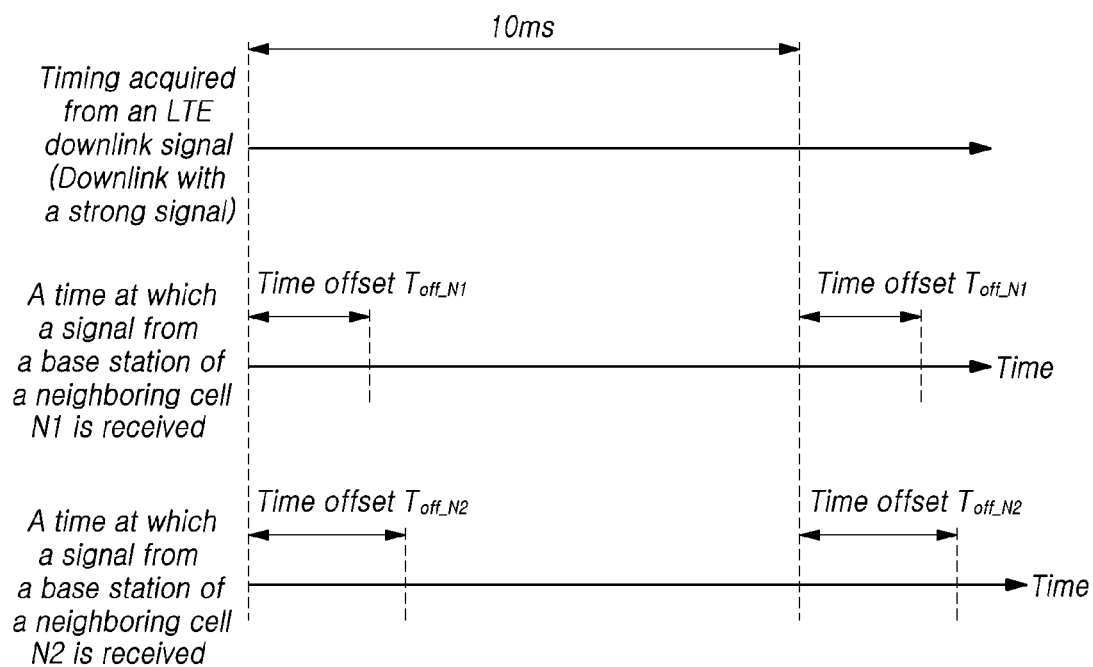
FIG. 17 illustrates an example of neighboring cell signal measurement of a location measurement device according to one aspect of the present disclosure.

FIG. 17 illustrates an example frame boundary of a downlink signal received by a location measurement device according to aspects of the present disclosure. The location measurement device in the illustration of FIG. 17 can select a signal from a base station from which the strongest downlink signal is received as a reference cell. The location measurement device can measure a boundary offset value of a frame of a signal received from a neighboring cell with respect to a downlink frame boundary of the reference cell. The location measurement device can transmit, to a location measurement server, IDs and offset values of at least one neighboring base station together with an ID of the reference cell. In another embodiment, the location measurement device may share such information with one or more other location measurement devices.

The location measurement server can calculate offset values between a serving cell and one or more neighboring cells based on respective measured offset values of one or more location measurement devices for a downlink signal and provide calculated offset values to the one or more location measurement devices. That is, the location measurement server can calculate time offsets of all offsets that can be calculated by combining the respective offset values transmitted by the location measurement devices, and provide the calculated time offsets in a message type to the location measurement devices. In one embodiment, it is assumed that a serving cell is S1. A first location measurement device can receive only respective signals from S1, N1, and N2. A second location measurement device can receive only respective signals from N2 and N3. A third location measurement device can receive only respective signals from N3 and N4. Here, S1 is an ID of the serving cell, and N1, N2, and N3 are IDs of respective neighboring cells. A location measurement server can calculate information on respective offsets of the neighboring cells with respective to a downlink frame boundary of the serving cell based on respective offset reports from the location measurement devices. In particular, in this scenario, respective reports from all three location measurement devices are required to calculate an offset value of N4. IDs of neighboring cells and corresponding respective offset values calculated in this manner may be provided to the respective location measurement devices. In one embodiment, the location measurement server can calculate the offsets by considering only results of one or more location measurement devices received within a time period of a recent T window. This is because a relative time between base stations may vary as time passes; therefore, the respective offsets may be calculated by considering only recently measured results.

In another embodiment, in some mobile communication systems, there may be provided a situation where one or more time offsets between base stations are constantly remained. In this situation, the location measurement server can acquire information on the time offsets from the mobile communication network, and provide this to the location measurement devices.

FIG. 18 illustrates an example message for providing time offsets from the location measurement server to each location measurement device. Referring to FIG. 18, one or more location measurement devices can transmit a message including time offset values of neighboring cells for which offset calculations can be performed and respective cell IDs of the neighboring cells. Such time offset values are values calculated with respect to a downlink signal of a serving cell.

The above discussion have been given based on a scenario where each location measurement device transmits a time offset value to the location measurement server, and the location measurement server calculates respective offset values of neighboring cells based on the received the time offset values. However, in another embodiment, each location measurement device can share such offset information with one another through a communication channel; thereby, calculate offsets of the neighboring base stations.

However, it is not needed for a process to be always operated, in which each location measurement device measures and reports offset values of neighboring cells, and the location measurement server calculates and transmits information on offsets the neighboring cells. This may be performed in a situation where one or more location measurement devices cannot receive a downlink signal of a serving cell. In one embodiment, when one or more location measurement devices cannot receive a signal of the serving cell, the location measurement server may instruct the one or more location measurement devices to perform offset measurement and transmission. In another embodiment, when one or more location measurement devices cannot receive both a signal of the serving cell and a GPS signal, the location measurement server may instruct the one or more location measurement devices to perform offset measurement and transmission. The location measurement server to which the offset measurement report is transmitted can calculate offsets of the neighboring cells, and transmit the calculated offset information to each location measurement device. When the location measurement server signals the offset measurement command to the location measurement devices, the location measurement devices can periodically report measured offsets for the neighboring cells, and the location measurement server can provide offset values for the neighboring cells calculated based on this to the location measurement devices. In this instance, a period in which the location measurement devices report the offsets may be set by the location measurement server. In another embodiment, such a report may be configured to be performed when an offset varies greater than or equal to a predetermined value.

Figure 19:
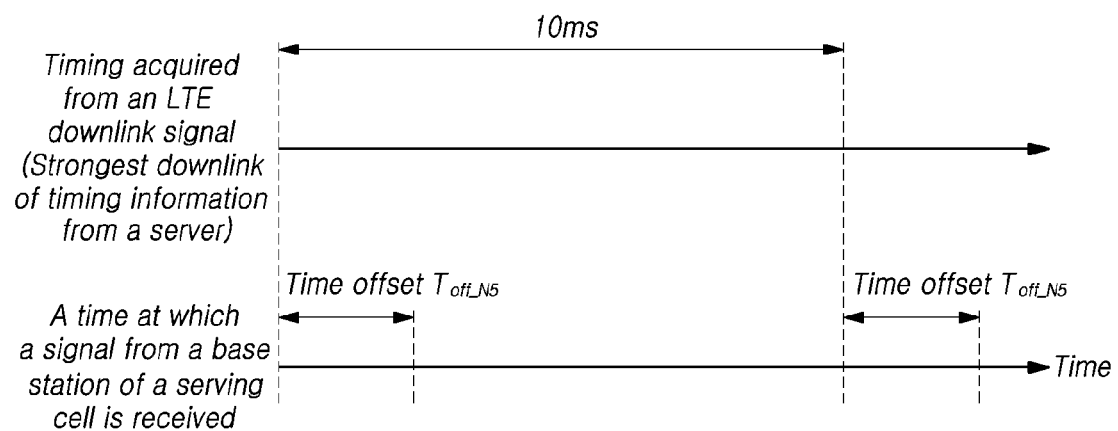
FIG. 19 illustrates an example of acquiring a frame boundary of a serving cell by a location measurement device from a signal of a neighboring cell according to one aspect of the present disclosure.

Location measurement devices can receive the offset message transmitted by the location measurement server, and thus acquire respective offset information of the neighboring cells. In this manner, one or more location measurement devices acquiring such offset information can acquire frame boundary information of a serving cell based on a downlink signal with the highest quality of the neighboring cells whose offset information has been acquired when one or more location measurement devices cannot receive a signal of the serving cell (or cannot receive a serving cell signal with a reliable quality). The highest quality may denote a downlink of a neighboring cell received with the greatest power. In another embodiment, the highest quality may denote a downlink of a neighboring cell received with the greatest SNR. FIG. 19 illustrates example operations in a location measurement device according to aspects of the present disclosure. The location measurement device can receive a downlink signal of a base station, which has the highest quality, among neighboring cells for which offset information has been acquired, and acquire a frame boundary of the downlink signal. Based on this, a signal corresponding to the frame boundary of the downlink signal transmitted by a location measurement server may be generated, and based on this, an uplink signal detection window of a target terminal may be set.

FIG. 19 illustrates embodiments related to an implementation of the location measurement device according to one aspect of the present disclosure. When a signal from a serving cell is not stably received, the location measurement device can select one of neighboring cells for which offset information has been acquired, and based on a downlink frame boundary of this neighboring cell, set a detection window of an uplink signal from the target terminal. More specifically, the target terminal can receive a downlink of a neighboring cell from which downlink with the highest quality is transmitted among neighboring cells for which offset information has been acquired, and acquire a frame boundary of the downlink. A frame boundary of a serving cell may be acquired when an offset value is added to this frame boundary. In the illustration of FIG. 19, such an offset value is represented as Toff N5. An uplink detection window of the target terminal can be set based on the frame boundary of the serving cell.

Discussions have been conducted on the location measurement device referring to FIGS. 3 and 4. The location measurement device according to the embodiments described above include the following features.

Referring to FIGS. 3 and 4, the location measurement device includes an uplink signal receiver (320, 420) for receiving an uplink signal from at least one target terminal whose location is required to be measured or whose presence or absence is required to be determined, and a controller (330, 430) for variably setting an uplink search time window of the uplink signal received from the at least one target terminal according to one, or two or more, of a location of the location measurement device, a location of a base station, a range of locations in which it is expected that the at least one target terminal is placed, a range of approximate locations of the at least one target terminal, a cell radius of the base station, a distance from the base station, and a signal detection range in which the uplink signal from the at least one target terminal is detected.

The location measurement device can include a downlink signal receiver (310, 410) for receiving a downlink signal from the base station and/or a GPS receiver (340, 440) for receiving a GPS signal. The controller (330, 430) can acquire information on time from the downlink signal and/or the GPS signal, and based on such information, set an uplink search time window of the at least one target terminal.

In this instance, the location measurement device can identify the location of the location measurement device based on one of its own location information that is acquired or its own location information that is manually input.

Further, the location measurement device can identify the location of the base station based on one of location information of the base station received from the base station or location information of the base station received from a location measurement server.

Further, the location measurement device can identify the cell radius of the base station based on one of cell radius information of the base station received from the base station or cell radius information of the base station received from a location measurement server.

Further, the location measurement device can identify the location of the location measurement device based on one of the acquired location information or the manually-input location information of the location measurement device, identify the location of the base station based on one of the location information of the base station received from the base station or the location information of the base station received from the location measurement server, and calculate the distance from the base station based on the identified location of the location measurement device and the identified location of the base station.

Further, the location measurement device can measure propagation attenuation of the downlink signal, and based on the measured propagation attenuation of the downlink signal, calculate a distance from the base station.

Further, the location measurement device can identify the signal detection range for detecting the uplink signal from the at least one target terminal based on one of signal detection range information received from the base station, signal detection range information received from a location measurement server, or signal detection range information calculated by the location measurement device.

Further, when the location measurement device itself calculates the signal detection range information, the location measurement device can calculate the signal detection range considering transmission power transmitted by the at least one target terminal and a propagation environment of a cell of the base station, a headroom report received from the at least one target terminal, the number of antennas of the at least one target terminal, types of the antennas of the at least one target terminal, a propagation environment of the location measurement device or a location of the location measurement device.

Further, the controller (330, 340) of the location measurement device can set an uplink search time window of an uplink signal received from the at least one target terminal based on a time at which the downlink signal is received, or set the uplink search time window of the uplink signal received from the at least one target terminal regardless of the time at which the downlink signal is received.

When the controller sets the uplink search time window of the uplink signal received from the at least one target terminal based on the time at which the downlink signal is received, the controller (330, 340) can acquire the downlink reception time based on a downlink reception time received by the location measurement device from the base station, or based on information on a downlink reception time received from one or more other location measurement devices or a location measurement server.

Further, when the location measurement device includes a GPS-based timer and a downlink-based timer, the location measurement device can acquire the downlink reception time through the controller by measuring a time difference between the GPS-based timer and the downlink-based timer. Further, considering a time difference between the GPS-based timer and the downlink reception time received from one or more other location measurement devices or a location measurement server (or a transmission time of the base station), the downlink reception time (or downlink transmission time of the base station) can be acquired. Further, the uplink search time window of at least one target terminal can be set based on such information.

The location measurement device can set an uplink detection window of at least one target terminal based on a downlink frame boundary of a neighboring cell. The controller can acquire offset information of downlink signals of neighboring cells and a serving cell. The controller can set a timer based on the downlink signal of the neighboring cell for which the offset information is acquired, and based on this, set an uplink detection window for the target terminal. Further, the location measurement device can measure one or more relative time offsets of frame boundaries of downlink signals transmitted by neighboring cells, and report the measurement to a location measurement server.

Figure 14:
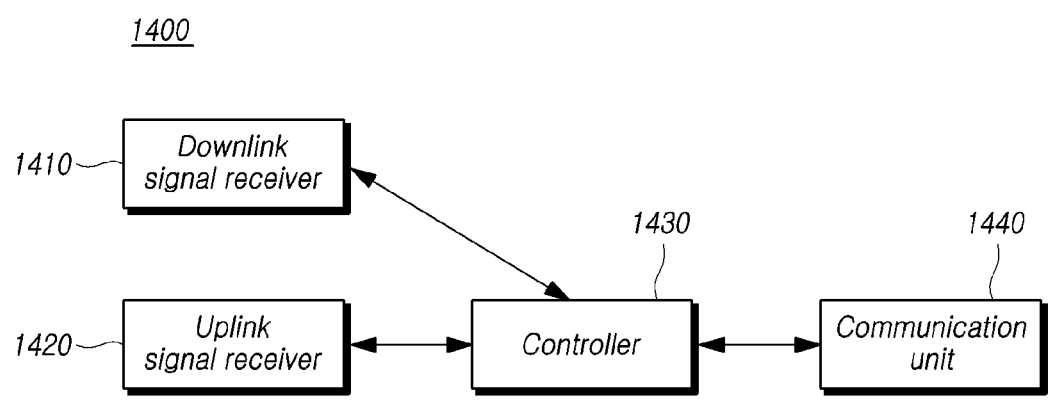
FIG. 14 illustrates an example of a base station of a mobile communication network according to one aspect of the present disclosure.

FIG. 14 illustrates a structure of a base station of a mobile communication network according to one aspect of the present disclosure.

Referring to FIG. 14, the base station 1400 includes a downlink signal transmitter 1410 and an uplink signal receiver 1420. The downlink signal transmitter 1410 performs a function of transmitting a signal to terminals. Further, the uplink signal receiver 1420 performs a function of receiving an uplink signal transmitted by the terminals.

Further, the base station 1400 of the mobile communication network includes a communication unit 1440 for transmitting RNTI information of a target terminal or channel configuration and resource assignment information thereof to a location measurement device. The base station 1400 can signal a status of the target terminal to the location measurement device. Further, a cell ID of a base station 1400 maintaining an established link with the target terminal and a cell ID of an adjacent base station maintaining time synchronization with the base station may be transmitted to the location measurement device. Further, the controller 1430 may configure the target terminal to transmit a signal using the downlink signal transmitter 1410 and the uplink signal receiver 1420 of the base station.

Figure 15:
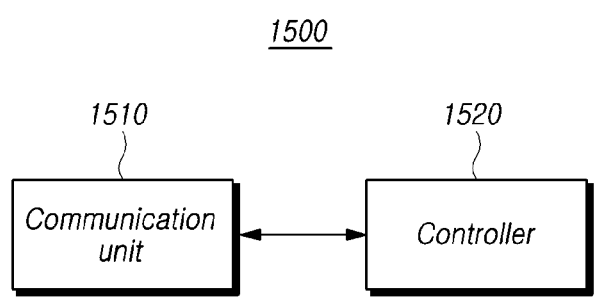
FIG. 15 illustrates an example of a location measurement server according to one aspect of the present disclosure.

FIG. 15 illustrates a location measurement server according to one aspect of the present disclosure.

Referring to FIG. 15, the location measurement server 1500 includes a communication unit 1510 and a controller 1520.

The communication unit 1510 has a function of communicating with an associated mobile communication network and one or more location measurement devices. The function of communicating with the mobile communication network receives identification information of a target terminal or uplink channel configuration and resource assignment information thereof. Further, status information of the target terminal, cell ID information of a base station maintaining an established link with the target terminal, and cell ID information of an adjacent base station maintaining time synchronization with the base station may be received.

The controller 1520 controls a function of receiving identification information of the target terminal or uplink channel configuration and resource assignment information thereof etc. from the base station of the mobile communication network. Further, the status information of the target terminal, the cell ID information of the base station maintaining an established link with the target terminal, and the cell ID information of an adjacent base station maintaining time synchronization with the base station may be received.

The location measurement server 1500 can transfer information received from the mobile communication network to one or more location measurement devices. Further, the location measurement server can perform a function of receiving measurement results for uplink of the target terminal from one or more location measurement devices, calculating a location of the target terminal, and transmitting the calculated location to one or more location measurement devices. Further, the controller 1520 can control a function of receiving a location measurement request for the target terminal from one or more location measurement devices or one or more other devices, and transferring the received request to the mobile communication network.

By receiving offset information between neighboring cells measured by each location measurement device, and based on this, calculating a time offset between each neighboring cell and a serving cell, the location measurement server 1500 can generate a message including such information and transmit it to each location measurement device.

Figure 16:
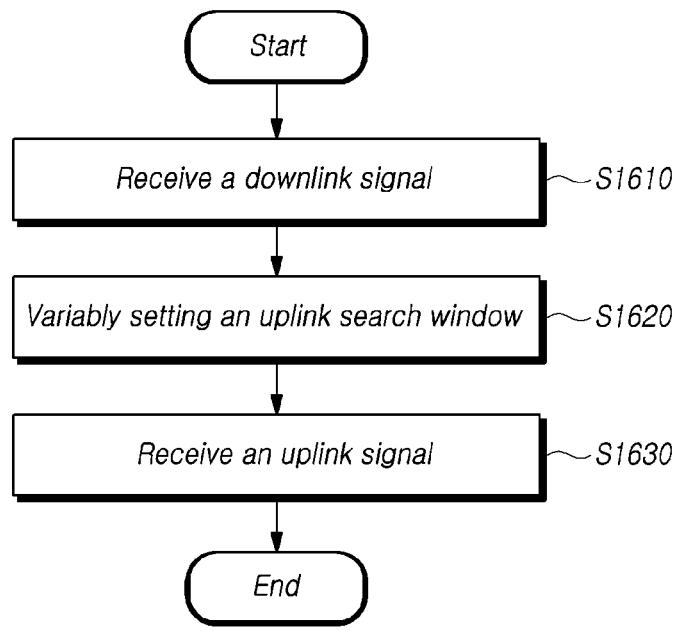
FIG. 16 is a flow diagram to show a location measurement method of a location measurement device according to another aspect of the present disclosure.

FIG. 16 is a flow diagram to show a location measurement method of a location measurement device according to another aspect of the present disclosure.

Referring to FIG. 16, the location measurement method 1600 includes a step S1610 of receiving a downlink signal from a base station, a step S1620 of variably setting an uplink search time window of an uplink signal received from at least one target terminal according to one, or two or more, of a location of the location measurement device, a range of locations in which it is expected that the at least one target terminal is placed, a range of approximate locations of the at least one target terminal, a location of the base station, a cell radius of the base station, a distance from the base station, and a signal detection range in which the uplink signal from the at least one target terminal is detected, and a step S1630 of receiving the uplink signal from the at least one target terminal whose location is required to be measured or whose presence or absence is required to be determined. The step S1610 of receiving the downlink signal from the base station may not be an essential feature in the location measurement method of the location measurement device according to another aspect of the present disclosure.

In the location measurement method 1600 of the location measurement device, a downlink signal from the base station or a GPS signal may be received. In the step S1620 of variably setting the uplink search time window, information on time can be acquired from the downlink signal and/or the GPS signal, and based on such information, an uplink search time window of the at least one target terminal can be set.

In this instance, in the location measurement method 1600 of the location measurement device, the location of the location measurement device can identified based on one of its own location information that is acquired or its own location information that is manually input.

Further, in the location measurement method 1600 of the location measurement device, the location of the base station can identified based on one of location information of the base station received from the base station or location information of the base station received from a location measurement server.

Location information of a target terminal may be used by receiving, through a location measurement server, initial location range information of the target terminal received from an urgent rescue center or a mobile communication system. Further, this may be acquired based on a range of locations of the target terminal calculated by the location measurement server based on measurement for a signal from the target terminal.

Further, in the location measurement method 1600 of the location measurement device, the cell radius of the base station can be identified based on one of cell radius information of the base station received from the base station or cell radius information of the base station received from a location measurement server.

Further, in the location measurement method 1600 of the location measurement device, the location of the location measurement device can be identified based on one of the acquired location information or the manually-input location information of the location measurement device, the location of the base station can be identified based on one of the location information of the base station received from the base station or the location information of the base station received from the location measurement server, and the distance from the base station can be calculated based on the identified location of the location measurement device and the identified location of the base station.

Further, in the location measurement method 1600 of the location measurement device, propagation attenuation of the downlink signal can be measured, and based on the measured propagation attenuation of the downlink signal, the distance from the base station can be calculated.

Further, in the location measurement method 1600 of the location measurement device, the signal detection range for detecting the uplink signal from the at least one target terminal can be identified based on one of signal detection range information received from the base station, signal detection range information received from a location measurement server, or signal detection range information calculated by the location measurement device.

Further, in the location measurement method 1600 of the location measurement device, when the location measurement device itself calculates the signal detection range information, the signal detection range can be calculated considering transmission power transmitted by the at least one target terminal and a propagation environment of a cell of the base station, a headroom report received from the at least one target terminal, the number of antennas of the at least one target terminal, types of the antennas of the at least one target terminal, a propagation environment of the location measurement device or a location of the location measurement device.

Further, in the location measurement method 1600 of the location measurement device, an uplink search time window of an uplink signal received from the at least one target terminal can be set based on a time at which the downlink signal is received, or the uplink search time window of the uplink signal received from the at least one target terminal can be set regardless of the time at which the downlink signal is received.

In the location measurement method 1600 of the location measurement device, when the controller sets the uplink search time window of the uplink signal received from the at least one target terminal based on the time at which the downlink signal is received, the downlink reception time can be acquired based on a downlink reception time received by the location measurement device from the base station or based on information on a downlink reception time received from one or more other location measurement devices or a location measurement server.

Further, in the location measurement method 1600 of the location measurement device, when the location measurement device includes a GPS-based timer and a downlink-based timer, the downlink reception time can be acquired through the controller by measuring a time difference between the GPS-based timer and the downlink-based timer.

In devices and methods for performing location measurement according to embodiments described above, when a timing synchronization window setting method for detecting an uplink signal from a target terminal is used, it is possible to improve a performance of acquiring timing synchronization of uplink from the terminal required to be detected.

Further, in devices and methods for performing location measurement according to embodiments described above, an associated uplink receiver can be implemented without significantly increasing the complexity of the location measurement device.

The standardized specifications or standard documents related to the embodiments described above constitute a part of the present disclosure. Accordingly, it should be construed that the incorporation of the content of the standardized specifications and part of the standard documents into the detailed description and claims is included within the scope of the present disclosure.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes, but to describe the embodiments, therefore, the scope of the present disclosure shall not be limited to such embodiments. The scope of protection of the present disclosure should be construed based on the following claims, and all technical ideas within the scope of equivalents thereof should be construed as being included within the scope of the present disclosure.

CROSS-REFERENCE TO RELATED APPLICATION

If applicable, this application claims priority under 35 U.S.C § 119(a) of Patent Application No. 10-2018-0120038, filed on Oct. 8, 2018 and Patent Application No. 10-2019-0124204, filed on Oct. 7, 2019 in Korea, the entire contents of which are incorporated herein by reference. In addition, this non-provisional application claims priorities in countries other than the U.S. for the same reason based on the Korean Patent Applications, the entire contents of which are hereby incorporated by reference.

What is claimed is:

1. A location measurement device comprising:
an uplink signal receiver configured to receive an uplink signal from at least one target terminal whose location is required to be measured or whose presence or absence is required to be determined in an uplink search time window, wherein the uplink signal is transmitted from the at least one target terminal to a base station; and
a controller configured to variably set a starting point or a size of the uplink search time window of the uplink signal received from the at least one target terminal according to one, or two or more, of a location of the location measurement device, a location of the base station, a range of locations in which it is expected that the at least one target terminal is placed, a cell radius of the base station, a distance from the base station to the location measurement device, and a signal detection range in which the uplink signal from the at least one target terminal is detected.

2. The location measurement device according to claim 1, further comprising:
a downlink signal receiver configured to receive a downlink signal from the base station; or
a GPS receiver configured to receive a GPS signal,
wherein the controller acquires time information from the downlink signal or the GPS signal, and based on the time information, sets the uplink search time window of the at least one target terminal.

3. The location measurement device according to claim 1, wherein the location of the location measurement device is identified based on one of its own location information that is acquired or its own location information that is manually input.

4. The location measurement device according to claim 1, wherein the location of base station is identified based on one of location information of the base station received from a mobile communication network or location information of the base station received from the location measurement server.

5. The location measurement device according to claim 1, wherein the cell radius of the base station is identified based on one of cell radius information of the base station received from a mobile communication network or cell radius information of the base station received from the location measurement server.

6. The location measurement device according to claim 1, wherein the location of the location measurement device is identified based on one of its own location information that is acquired or its own location information that is manually input,
wherein the location of base station is identified based on one of location information of the base station received from the base station or location information of the base station received from the location measurement server, and
wherein the distance from the base station to the location measurement device is calculated based on the identified location of the location measurement device and the identified location of the base station.

7. The location measurement device according to claim 1, wherein the distance from the base station to the location measurement device is calculated based on a propagation attenuation obtained by measuring the downlink signal.

8. The location measurement device according to claim 1, wherein the signal detection range for detecting the uplink signal from the at least one target terminal is identified based on one of signal detection range information received from the base station, signal detection range information received from the location measurement server, or signal detection range information calculated by the location measurement device.

9. The location measurement device according to claim 8, wherein when the location measurement device itself calculates the signal detection range information, the location measurement device calculates the signal detection range considering one, two or more, of transmission power transmitted by the at least one target terminal and a propagation environment of a cell of the base station, a headroom report received from the at least one target terminal, a number of antennas of the at least one target terminal, types of the antennas of the at least one target terminal, a propagation environment of the location measurement device or a location of the location measurement device.

10. The location measurement device according to claim 1, wherein the controller sets the uplink search time window of the uplink signal received from the at least one target terminal based on a time at which the downlink signal is received or regardless of the time at which the downlink signal is received.

11. The location measurement device according to claim 10, wherein when the controller sets the uplink search time window of the uplink signal received from the at least one target terminal based on the time at which the downlink signal is received, the time at which the downlink signal is received is acquired based on a downlink reception time received by the location measurement device from the base station or based on information on a downlink reception time received from one or more other location measurement devices or the location measurement server.

12. The location measurement device according to claim 10, wherein when the location measurement device further comprises a GPS-based timer and a downlink-based timer, the controller calculates the downlink reception time considering a time difference between the GPS-based timer and the downlink-based timer.

13. A location measurement method of a location measurement device comprising:
receiving an uplink signal from at least one target terminal whose location is required to be measured or whose presence or absence is required to be determined in an uplink search time window, wherein the uplink signal is transmitted from the at least one target terminal to a base station; and variably setting a starting point or a size of the uplink search time window of the uplink signal received from the at least one target terminal according to one, or two or more, of a location of the location measurement device, a location of the base station, a cell radius of the base station, a distance from the base station to the location measurement device, a range of locations in which it is expected that the at least one target terminal is placed, and a signal detection range in which the uplink signal from the at least one target terminal is detected.

* * * * *